United States Patent
Brown et al.

(10) Patent No.: US 8,634,405 B2
(45) Date of Patent: Jan. 21, 2014

(54) SYSTEM AND METHOD FOR SYNCHRONIZING PHASES AND FREQUENCIES OF DEVICES IN MULTI-USER, WIRELESS COMMUNICATIONS SYSTEMS

(75) Inventors: Donald Richard Brown, Worcester, MA (US); H. Vincent Poor, Princeton, NJ (US); Boyang Zhang, Shiiiazhuang (CN)

(73) Assignees: The Trustees of Princeton University, Princeton, NJ (US); Worcester Polytechnic Institute, Worcester, MA (US)

( * ) Notice: Subject to any disclaimer, the term of this patent is extended or adjusted under 35 U.S.C. 154(b) by 520 days.

(21) Appl. No.: 12/555,390

(22) Filed: Sep. 8, 2009

(65) Prior Publication Data
US 2010/0103917 A1    Apr. 29, 2010

Related U.S. Application Data

(60) Provisional application No. 61/191,311, filed on Sep. 8, 2008.

(51) Int. Cl.
*H04J 1/00*    (2006.01)
*H04J 3/06*    (2006.01)

(52) U.S. Cl.
USPC .......................................... 370/350; 370/343

(58) Field of Classification Search
USPC .......... 370/310, 328, 330, 345, 350; 709/204, 709/205, 223, 224
See application file for complete search history.

(56) References Cited

U.S. PATENT DOCUMENTS

| | | | |
|---|---|---|---|
| 5,581,517 A * | 12/1996 | Gee et al. | 367/138 |
| 5,581,620 A * | 12/1996 | Brandstein et al. | 381/92 |
| 7,594,010 B2 * | 9/2009 | Dohler et al. | 709/224 |
| 7,630,339 B2 * | 12/2009 | Laroia et al. | 370/330 |
| 2006/0023803 A1 * | 2/2006 | Perlman et al. | 375/267 |
| 2007/0153731 A1 * | 7/2007 | Fine | 370/329 |
| 2008/0036648 A1 * | 2/2008 | Green et al. | 342/174 |
| 2010/0238956 A1 * | 9/2010 | Preuss et al. | 370/503 |

OTHER PUBLICATIONS

Mudumbai, et al., "On the Feasibility of Distributed Beamforming in Wireless Networks," IEEE Trans. Wireless Communications, vol. 6, No. 4, Apr. 2007 (10 pages).

(Continued)

*Primary Examiner* — Chi Pham
*Assistant Examiner* — Robert Lopata
(74) *Attorney, Agent, or Firm* — McCarter & English, LLP

(57) ABSTRACT

A system and method for synchronizing the phases and frequencies of devices in multi-user, wireless communications systems are provided. A primary beacon signal is transmitted by a destination node in a wireless communications network to a plurality of source nodes. Secondary beacon signals are also exchanged between the source nodes. Using the primary and secondary beacon signals, the nodes generate local phase and frequency estimates which are used to control local phases and frequencies of the source nodes. The source nodes then transmit common information to the destination at carrier frequencies based on the estimated local frequencies and phases, so that the phases and frequencies of the transmitted information are synchronized to facilitate coherent combining of the bandpass signals at the destination. Phase and frequency synchronization can be applied to wireless communications systems having any number of source nodes, and effects of Doppler shifts and moving platforms are accounted for. Acoustic and radio-frequency signaling can be utilized.

23 Claims, 16 Drawing Sheets

(56) References Cited

OTHER PUBLICATIONS

Tu, et al., "Coherent Cooperative Transmission From Multiple Adjacent Antennas to a Distant Stationary Antenna Through AWGN Channels," in Proc. IEEE Veh. Technol. Conf. (VTC), Birmingham, AL, Spring 2002, vol. 1, pp. 130-134 (5 pages).

Mudumbai, et al., "Distributed Transmit Beamforming Using Feedback Control," IEEE Trans. Inf. Theory, (No Date) (25 pages).

Brown III, et al., "A Method for Carrier Frequency and Phase Synchronization of Two Autonomous Cooperative Transmitters," Proceedings of the IEEE 6th Workshop on Signal Processing Advances in Wireless Communications (SPAWC 2005), pp. 260-264, New York, NY, Jun. 5-8, 2005 (5 pages).

Barriac, et al., "Distributed Beamforming for Information Transfer in Sensor Networks," in Proc. Inf. Process. Sens. Networks (IPSN), Third Int. Workshop, Berkeley, CA, Apr. 26-27, 2004 (8 pages).

Mudumbai, et al., "Distributed Transmit Beamforming: Challenges and Recent Progress," IEEE Communications Magazine, vol. 47, No. 2, pp. 102-110, Feb. 2009 (12 pages).

Mudumbai, et al., "Distributed Beamforming Using 1 Bit Feedback: from Concept to Realization," (invited paper) Proc. of 44'th Allerton Conference on Communication Control and Computing, Sep. 2006, pp. 1020-1027 (8 pages).

Mudumbai, et al., "Scalable Feedback Control for Distributed Beamforming in Sensor Networks," in Proc. IEEE Intl. Symp. on Inform. Theory (ISIT'05), Sep. 2005, pp. 137-141 (5 pages).

Ozil, et al., "Time-Slotted Round-Trip Carrier Synchronization," 41st Asilomar Conference on Signals, Systems and Computers, Nov. 4-7, 2007, pp. 1781-1785 (5 pages).

Brown, III, et al., "Time-Slotted Round-Trip Carrier Synchronization for Distributed Beamforming," IEEE Transactions on Signal Processing, vol. 56, No. 11, Nov. 2008, pp. 5630-5643 (14 pages).

D. Richard Brown, III, "Round-Trip Carrier Synchronization for Distributed Transmit Beamforming," slide show printouts from seminar dated Apr. 18, 2008 (38 pages).

\* cited by examiner

SYSTEM AND METHOD FOR SYNCHRONIZING PHASES AND FREQUENCIES OF DEVICES IN MULTI-USER, WIRELESS COMMUNICATIONS SYSTEMS

RELATED APPLICATIONS

The present application claims the benefit of U.S. Provisional Application Ser. No. 61/191,311, filed on Sep. 8, 2008, the entire disclosure of which is expressly incorporated herein by reference.

GOVERNMENT RIGHTS

This invention was made with government support under Grant Nos. CCF-04-47743, ANI-03-38807 and CNS-06-25637 awarded by the National Science Foundation. The government has certain rights in the invention.

BACKGROUND OF THE INVENTION

1. Field of the Invention

The present invention relates to the field of wireless communications devices and networks. More specifically, the present invention relates to a system and method for synchronizing phases and frequencies of devices in multi-user, wireless communications systems.

2. Related Art

In multiuser wireless communication systems, the term "distributed beamforming" describes the situation in which two or more separate transmitters with common information work together to emulate an antenna array and to focus their bandpass transmissions toward an intended destination. Distributed beamforming has also been referred to as "collaborative beamforming" and "virtual antenna arrays," and has also been discussed in the context of coherent cooperative transmission and cooperative multiple-input/multiple-output (MIMO) transmission. In all of these systems, the basic principle is the same: individual sources with common information transmit with phase-aligned carriers such that their bandpass transmissions combine constructively after propagation to the intended destination.

There are several advantages to distributed beamforming. By focusing the transmission toward the intended destination, for instance, less transmit power is needed to achieve a desired signal-to-noise ratio (SNR) target. This feature is particularly appealing in wireless communication systems with energy-constrained nodes, such as sensor networks. In these types of systems, nodes are typically too small to allow for the use of conventional antenna arrays. Distributed beamforming is a powerful technique that offers the potential power gains of conventional antenna arrays to wireless communication systems composed of multiple single-antenna users.

Difficulties with distributed beamforming systems relate to the alignment (synchronization) of phases and frequencies of the transmitters. This difficulty is due, in large part, to the fact that each transmitter in a distributed beamformer has an independent local oscillator which can drift in phase and frequency over time. Transmitters in a distributed beamformer therefore require some method to synchronize their carrier signals so that the bandpass transmissions arrive with reasonable phase and frequency alignment at the intended destination. A precise phase alignment is not critical for beamforming. For example, a two-antenna beamformer with a 30 degree phase offset in the received carriers only suffers a loss with respect to ideal beamforming of approximately 7% of the power in the intended direction. The power gain of a beamformer becomes a power penalty, however, when the carriers arrive at the destination with more than 90 degrees of phase offset. Therefore, there is a need for adequate carrier synchronization to ensure energy-efficient transmission to the destination and to ensure that the sources do not cancel each other's transmissions.

SUMMARY OF THE INVENTION

The present invention relates to a system and method for synchronizing phases and frequencies of devices in multi-user, wireless communications systems. A primary beacon signal is generated by a destination node in a wireless communications network, and transmitted to a set of M source nodes (M being any integer greater than or equal to 2) in the wireless communications network. Using the primary beacon signal, the source nodes generate local phase and frequency estimates. Source node 1 then generates a secondary beacon signal, and transmits the secondary beacon signal to source node 2 at the frequency and phase estimated by the source node 1 using the primary beacon signal. Using the received secondary beacon signal, the source node 2 generates additional local phase and frequency estimates. The secondary beacon signal is then retransmitted from source node 2 to source node 3, and so on, and local phase and frequency estimates are generated at each node, until the beacon is received by source node M. Source node M then generates another secondary beacon signal, and transmits it to source node M−1 at the phase and frequency estimated by the source node M using the first beacon signal. This process is repeated from source node M−1 to source node M−2, and so on, until the retransmitted beacon is received by source node 1. All of the source nodes then transmit common information to the destination at carrier frequencies based on the estimated local frequencies and phases, so that the phases and frequencies of the transmitted information arrive in phase and constructively combine at the destination.

The present invention can be applied to wireless radio frequency communications networks having any number of M>1 stationary or mobile source nodes, each of which is capable only of half-duplex transmission and reception, and none of which have knowledge of their local time or their location within the network. The effects of Doppler shifts and moving platforms are also accounted for, and the present invention can also be applied to acoustic communications networks, i.e., networks of nodes which communicate using acoustic waves.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a system and method for synchronizing phases and frequencies in multi-user, wireless communications devices, as discussed in detail below in connection with FIGS. 1-19.

Figure 1:
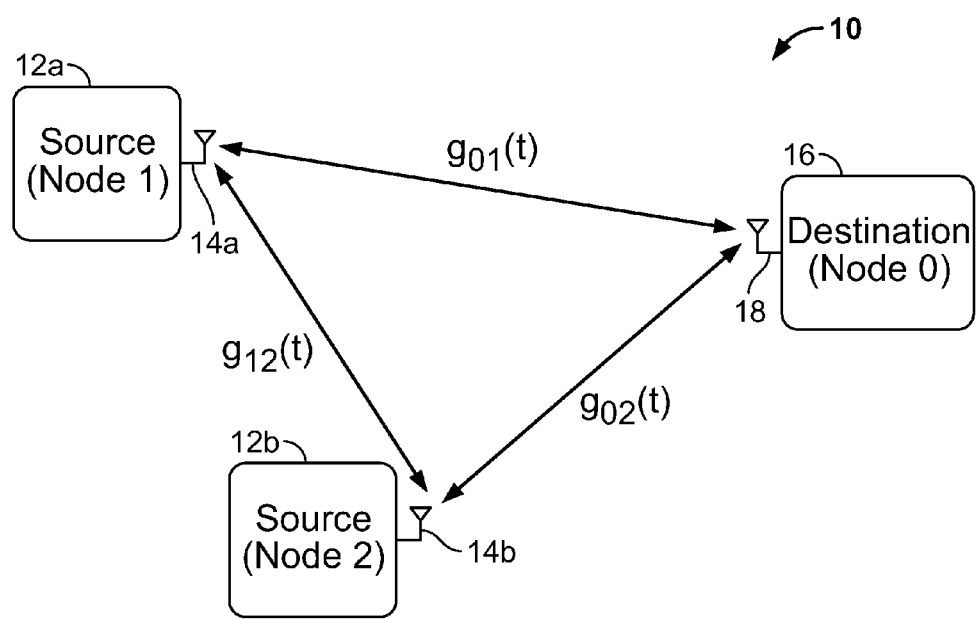
FIG. 1 is a diagram showing a two-source (M=2) wireless communications network in which the present invention can be implemented to synchronize phases and frequencies.

FIG. 1 is a diagram showing a two-source (M=2), one-destination system model, indicated generally at 10, of a wireless communications network in which the present invention can be implemented. The network 10 includes two or more source nodes 12a, 12b and a destination node 16, each of which could be a wireless communications device such as a cellular telephone, wireless network transceiver, base station, transceiver in a sensor network, personal computer, etc. The nodes 12a, 12b and 16 can operate using a suitable, multi-user, wireless communications protocol, such as orthogonal frequency-division, multiple-access (OFDMA) protocol.

Both sources 14a, 14b are assumed in the model 10 to have respective isotropic antennas 14a, 14b, each of which are single (e.g., non-array) antennas. The node 16 also includes an antenna 18. The channel from node i to node j is modeled as a linear, time-invariant (LTI) system with impulse response $g_{ij}(t)$. Each channel in the system is assumed to be finite-impulse-response (FIR) with delay spread $v_{ij}$. The impulse response of each channel in the system is assumed to be reciprocal in the forward and reverse directions, i.e., $g_{ij}(t)=g_{ji}(t)$, and the noise in each channel is assumed to be Gaussian and white with power spectral density $N_0/2$. It is assumed that both sources have identical information to transmit to the destination.

Figure 2:
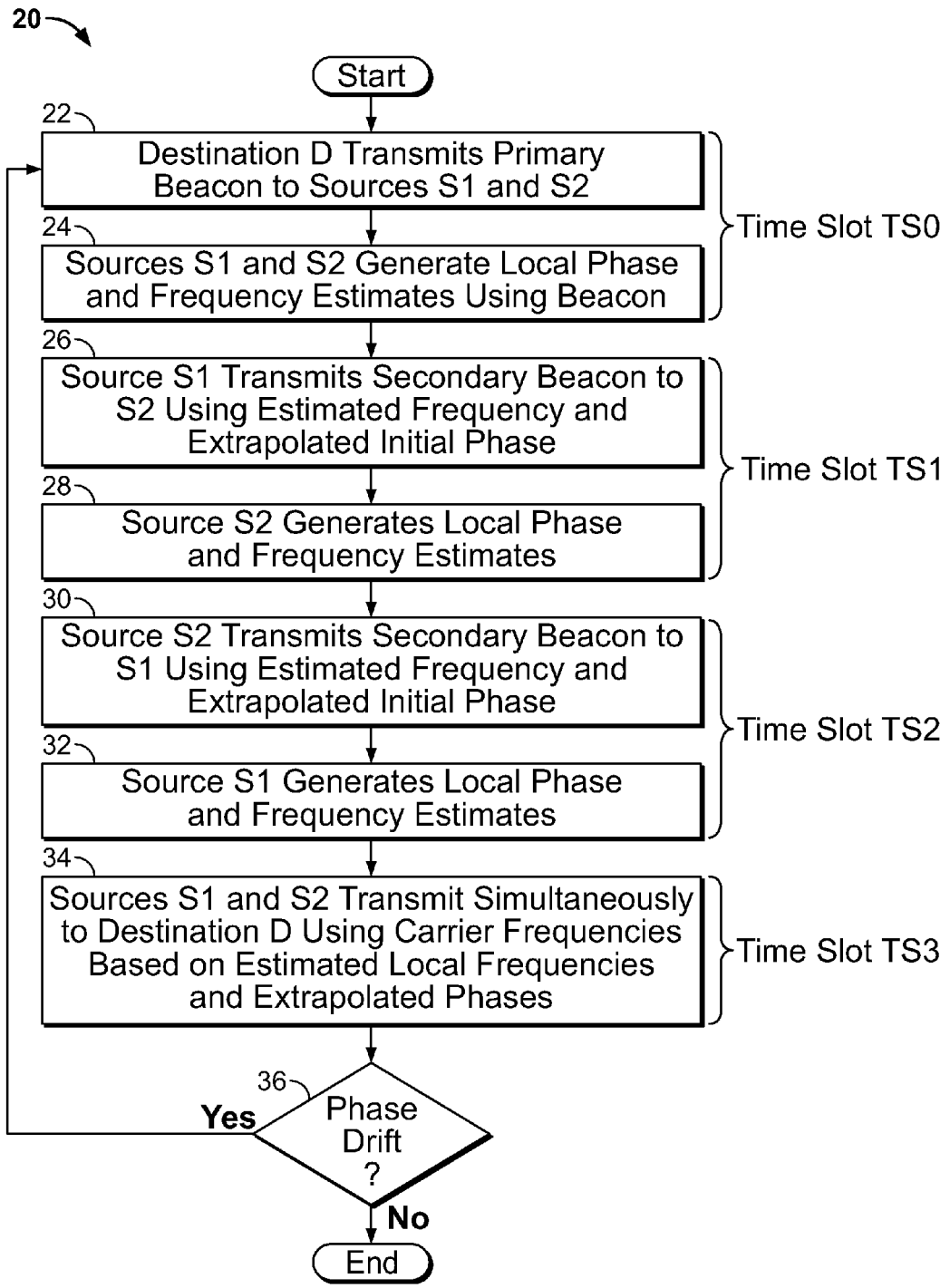
FIG. 2 is a flowchart showing processing steps according to the present invention for synchronizing phases and frequencies of devices in a two-source (M=2) wireless communication system.
Figure 3A:
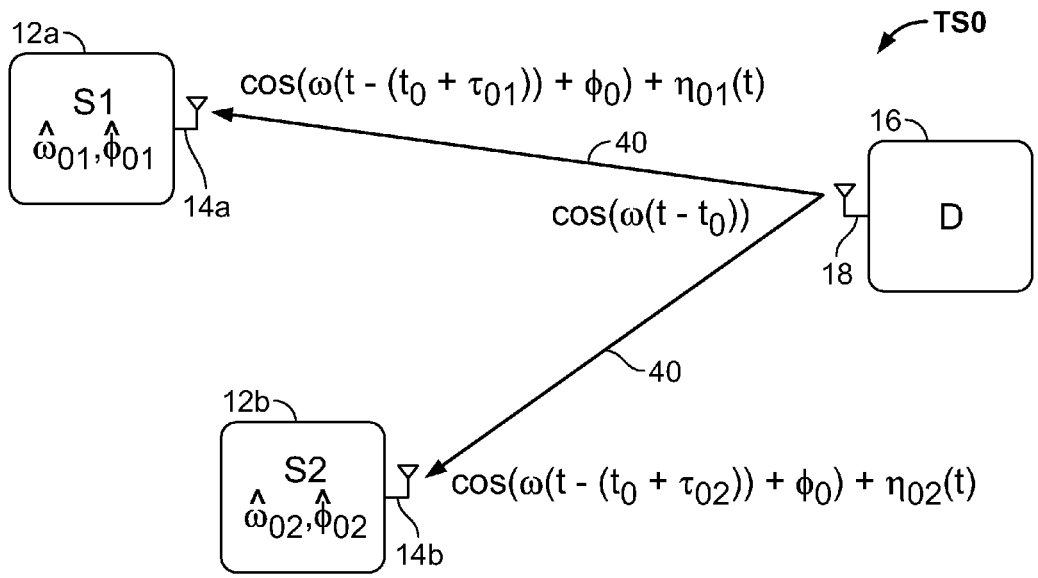
FIGS. 3A-3D are diagrams showing signaling steps implemented by the process shown in FIG. 2.

FIG. 2 is a flowchart showing processing steps according to the present invention, indicated generally at 20, for synchronizing the phases and frequencies of two sources 14a, 14b (M=2) for facilitating virtual antenna beamforming from the sources 14a, 14b to the destination 16. Reference is also made to FIGS. 3A-3D, which are diagrams showing the signaling steps carried out by the process of FIG. 2 in various timeslots TS0-TS3 (or, $TS_0$-$TS_3$). It is noted that the sources 14a, 14b are also referred to herein as sources S1 and S2 (or, $S_1$ and $S_2$) and the destination 16 is referred to herein as destination D. Beginning in step 22, the destination D transmits a primary sinusoidal beacon signal 40 to sources S1 and S2 (as shown in FIG. 3A). Then, in step 24, the sources S1 and S2 generate local phase and frequency estimates using the received beacon signal 40. Steps 22 and 24 are carried out in a first timeslot TS0.

The beacon signal 40 could, among other possibilities, be a unit-amplitude sinusoidal primary beacon of duration $T_0$ from the destination to both sources, $$x_0(t)=\cos(\omega(t-t_0)+\phi_0) t\epsilon[t_0, t_0+T_0).$$ (Equation 1)

Under the assumption that all of the channels are single-path, i.e. $g_{ij}(t)=\alpha_{ji}\delta(t-\tau_{ij}) \forall ij$, the signal received at $S_j$ in TS0 can be written as:

$$y_{0j}(t)=\alpha_{0j}\cos(\omega(t-(t_0+\tau_{0j}))+\phi_0)+\eta_{0j}(t)$$

for $t\epsilon[t_0+\tau_{0j}, t_0+\tau_{0j}+T_0)$ where $\eta_{0j}(t)$ denotes the additive white Gaussian noise (AWGN) in the 0→j channel and $j\epsilon\{1, 2\}$. Each source uses its noisy observation from the first timeslot to compute estimates of the received frequency and phase; these estimates are denoted as $\hat{\omega}_{0j}$ and $\hat{\phi}_{0j}$, respectively, at $S_j$ for $j\epsilon\{1,2\}$. We use the usual convention that the phase estimate $\hat{\phi}_{0j}$ is an estimate of the phase of the received signal at the start of the observation at $S_j$, i.e. $\hat{\phi}_{0j}$ is an estimate of the phase of $y_{0j}(t)$ at time $t_0+\tau_{0j}$.

Figure 3B:
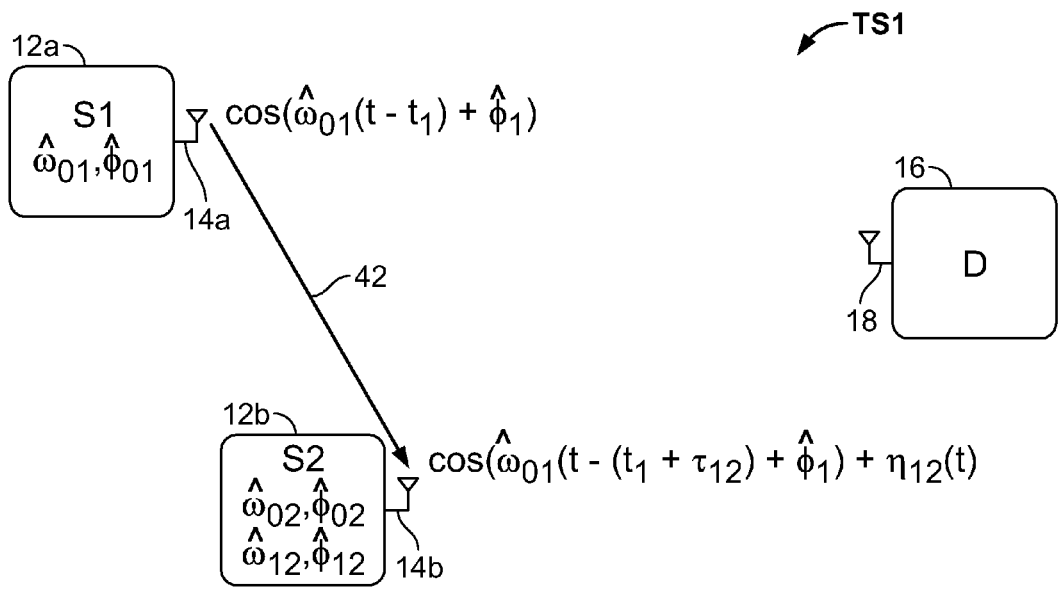

In step 26, the source S1 transmits a secondary sinusoidal beacon signal 42 to S2 using the estimated frequency and initial phase extrapolated in timeslot TS0 (as shown in FIG. 3B). Then, in step 28, source S2 receives the beacon signal 42 and generates local phase and frequency estimates using the received beacon signal 42. Steps 26 and 28 are carried out in a second timeslot TS1.

The timeslot TS1 begins immediately upon the conclusion of the primary beacon $y_{01}(t)$ at $S_1$. At time $t_1=\tau_{01}+T_0$, $S_1$ begins transmitting the sinusoidal secondary beacon signal 42 to $S_2$ that is a periodic extension of $y_{01}(t)$ (possibly with different amplitude) using the phase and frequency estimates $\hat{\omega}_{01}$ and $\hat{\phi}_{01}$. To generate the periodic extension, the frequency estimate $\hat{\omega}_{01}$ is used to extrapolate the estimated phase of $y_{01}(t)$ at time $t_0+\tau_{01}$ to a phase estimate of $y_{01}(t)$ at time $t_1$. The extrapolated phase estimate at $S_1$ at time $t_1$ can be written as:

$$\hat{\phi}_1=\hat{\phi}_{01}+\hat{\omega}_{01}(t_1-(t_0+\tau_{01}))=\hat{\phi}_{01}+\hat{\omega}_{01}T_0.$$

The secondary beacon transmitted by $S_1$ in TS1 can be written as:

$$x_{12}(t)=a_{12}\cos(\hat{\omega}_{01}(t-t_1)+\hat{\phi}_1) t\epsilon[t_1,t_1+T_1).$$

After propagation through the 1→2 channel, this secondary beacon is received by $S_2$ as:

$$y_{12}(t)=\alpha_{12}a_{12}\cos(\hat{\omega}_{01}(t-(t_1+\tau_{12}))+\hat{\phi}_1)+\eta_{12}(t)$$

for $t\epsilon[t_1+\tau_{12}, t_1+\tau_{12}+T_1)$ where $\eta_{12}(t)$ denotes the AWGN in the 1→2 channel. From this noisy observation, $S_2$ generates estimates of the received frequency and phase; these estimates are denoted as $\hat{\omega}_{12}$ and $\hat{\phi}_{12}$, respectively.

Figure 3C:
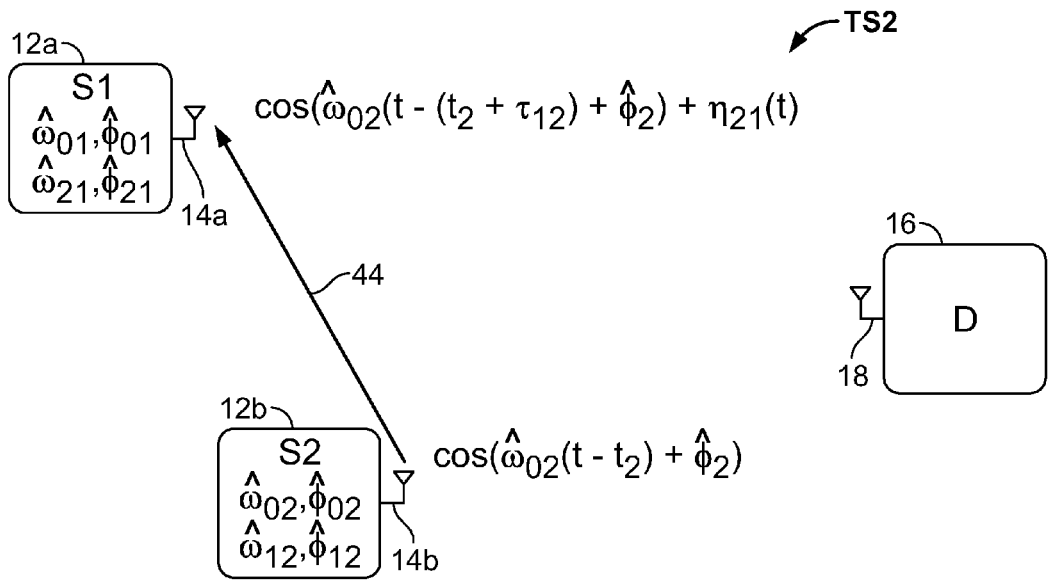

In step 30, the source S2 transmits a secondary sinusoidal beacon signal 44 to S1 using the estimated frequency and initial phase extrapolated in timeslot TS0 (as shown in FIG. 3C). Then, in step 32, source S1 receives the beacon signal 44 and generates local phase and frequency estimates using the received beacon signal 44. Steps 30 and 32 are carried out in a third timeslot TS2.

The timeslot TS2 begins immediately upon the conclusion of $y_{12}(t)$ at $S_2$. At time $t_2=t_1+\tau_{12}+T_1$, $S_2$, $S_2$ begins transmitting the sinusoidal secondary beacon signal 44 to $S_1$ that is a periodic extension of $y_{02}(t)$ using the phase and frequency estimates $\hat{\omega}_{02}$ and $\hat{\phi}_{02}$. Note that $S_2$'s secondary beacon is a periodic extension of the primary beacon it received in TS0 even though its transmission begins at the conclusion of the secondary beacon received in TS1. Here, $S_2$ extrapolates the phase estimate $\hat{\phi}_{02}$ obtained at time $t_0+\tau_{02}$ time $t_2$ using the frequency estimate $\hat{\omega}_{02}$ in order to determine the appropriate initial phase of the secondary beacon signal 44. The extrapolated phase estimate at $S_2$ at time $t_2$ can be written as:

$$\hat{\phi}_2 = \hat{\phi}_{02} + \hat{\omega}_{02} + \omega_{02}(t_2 - t(t_0 + \tau_{02}))$$
$$= \hat{\phi}_{02} + \hat{\omega}_{02}(\tau_{01} + \tau_{12} - \tau_{02} + T_0 + T_1).$$

The secondary beacon signal 44 transmitted by $S_2$ in TS2 can be written as:

$$x_{21}(t)=a_{21}\cos(\hat{\omega}_{02}(t-t_2)+\hat{\phi}_2)\ t\epsilon[t_2,t_2+T_2).$$

After propagation through the 2→1 channel, the secondary beacon signal 44 is received by $S_1$ as:

$$y_{21}(t)=\alpha_{12}a_{21}\cos(\hat{\omega}_{02}(t-(t_2+\tau_{12}))+\hat{\phi}_2)+\eta_{21}(t)$$

for $t\epsilon[t_2+\tau_{12}, t_2+\tau_{12}+T_2)$ where $\eta_{21}(t)$ denotes the AWGN in the 1→2 channel and where we have applied the assumption that $\tau_{21}=\tau_{12}$ and $\alpha_{21}=\alpha_{12}$. From this noisy observation, $S_1$ generates estimates of the received frequency and phase; these estimates are denoted as $\hat{\omega}_{21}$ and $\hat{\phi}_{21}$, respectively.

Figure 3D:
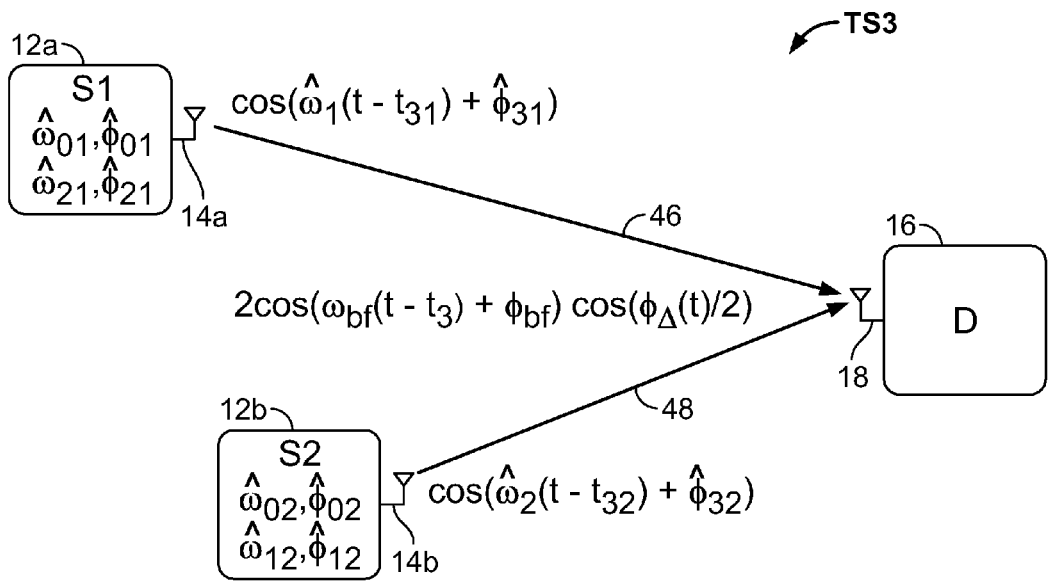

In step 34, which occurs in a fourth timeslot TS3, the sources S1 and S2 transmit signals 46 and 48 simultaneously to destination D (as shown in FIG. 3D) using carrier frequencies based on the estimated local frequencies and extrapolated phases. Specifically, in timeslot TS3, both $S_1$ and $S_2$ transmit to the destination as a distributed beamformer with carriers generated as periodic extensions of the secondary beacon signals 42 and 44 received at each source. Since our focus is on the performance of the distributed beamformer in terms of the phase difference of the received signals at the destination, we write the transmissions of $S_1$ and $S_2$ as unmodulated carriers. The unmodulated carrier transmitted by $S_j$ during TS3 can be written as:

$$x_{j0}(t)=a_{j0}\cos(\hat{\omega}_j(t-t_{3j})+\hat{\phi}_{3j})\ t\epsilon[t_{3j},t_{3j}+T_3)\quad\text{(Equation 2)}$$

where $\hat{\omega}_j$ is a frequency estimate at $S_j$ that is a function of both $\hat{\omega}_{0j}$ and $\hat{\omega}_{ij}$, $i\neq j$. The extrapolated phase estimates at times $t_{31}$ and $t_{32}$ are based on the phase and frequency estimates obtained from the secondary beacon observations and can be written as:

$$\hat{\phi}_{31}=\hat{\omega}_{21}+\hat{\omega}_{21}(t_{31}-(t_2+\tau_{12}))\text{ and}$$

$$\hat{\phi}_{32}=\hat{\phi}_{12}+\hat{\omega}_{12}(t_{32}-(t_1+\tau_{12})),\quad\text{(Equations 3 and 4)}$$

respectively. As for the transmission start times $t_{31}$ and $t_{32}$, $S_1$ begins transmitting its carrier immediately upon the conclusion of the secondary beacon from $S_2$, hence $$t_{31}=t_2+\tau_{12}+T_2=t_0+\tau_{01}+2\tau_{12}+T_0+T_1+T_2.$$

If $S_2$ begins transmitting immediately upon the conclusion of its secondary beacon transmission, its carrier will arrive at D earlier than $S_1$'s carrier. To synchronize the arrivals of the carriers, $S_2$ should wait for $\tau_{delay}=\tau_{01}+\tau_{12}-\tau_{02}$ after the conclusion of the transmission of its secondary beacon before transmitting its carrier in timeslot TS3. This implies that:

$$t_{32}=t_2+T_2+\tau_{delay}=t_0+2\tau_{01}+2\tau_{12}-\tau_{02}+T_0+T_1+T_2.$$

By inspection of FIG. 1, it is noted that $\tau_{delay}$ must be non-negative. Moreover, $S_2$ can directly estimate $\tau_{delay}$ by observing the amount of time that elapses from the end of its primary beacon observation in TS0 to the start of its secondary beacon observation in TS1, i.e.

$$\tau_{delay}=(t_1+\tau_{12})-(t_0+\tau_{02}+T_0).$$

The signal received at D in TS3 can be written as the sum of both carrier transmissions after their respective channel delays, i.e., $$y_0(t)=\alpha_{01}a_{10}\cos(\hat{\omega}_1(t-t_3)+\hat{\phi}_{31})+\alpha_{02}a_{20}\cos(\hat{\omega}_2(t-t_3)+\hat{\phi}_{32})+\eta_0(t)$$

for $t\epsilon[t_3, t_3+T_3)$ where $t_3=t_{31}+\tau_{01}=t_{32}+\tau_{02}$. Standard trigonometric identities can be applied to rewrite $y_0(t)$ as:

$$y_0(t) = a_{bf}(t)\cos(\phi_{bf}(t)) + \eta_0(t)\quad\text{(Equation 5)}$$

$$t \in [t_3, t_2 + T_3]$$

where $$a_{bf}(t) := \sqrt{(\alpha_{01}a_{10})^2 + (\alpha_{02}a_{20})^2 + 2\alpha_{01}a_{10}\alpha_{02}a_{20}\cos(\phi_\Delta(t))}$$

$$\phi_{bf}(t) := \hat{\omega}_1(t-t_3) + \hat{\phi}_{31} + \tan^{-1}\left[\frac{\alpha_{02}a_{20}\sin(\phi_\Delta(t))}{\alpha_{01}a_{10} + \alpha_{02}a_{20}\cos(\phi_\Delta(t))}\right]$$

and where we have defined the carrier phase offset $$\phi_\Delta(t):=(\hat{\omega}_2-\hat{\omega}_1)(t-t_3)+\hat{\phi}_{32}-\hat{\phi}_{31}\ t\epsilon[t_3,t_3+T_3).$$

In the special case when carriers arrive at the destination with the same amplitude, i.e. $\alpha_{01}a_{10}=\alpha_{02}a_{20}=a$, the expressions for $a_{bf}(t)$ and $\phi_{bf}(t)$ simplify to:

$$a_{bf}(t)=2a\cos(\phi_\Delta(t)/2)\ t\epsilon[t_3,t_3+T_3)$$

$$\phi_{bf}(t)=[(\hat{\omega}_1+\hat{\omega}_2)(t-t_3)+\hat{\phi}_{31}+\hat{\phi}_{32}]/2$$

In step 36, a determination is made as to whether unacceptable phase drift has occurred between sources S1 and S2 during beamforming, which could occur during long transmissions. If so, control returns to step 22, so that timeslots TS0-TS3 can be repeated. Otherwise, processing ends.

The present invention can also be effective in communication systems with multipath LTI channels if minor modifications are made to account for the transient effects of the channels. Such modifications are summarized below.

As with single-path channels, the present invention begins with the transmission of a sinusoidal primary beacon of duration $T_0$ from the destination D. Since the beacon is of finite duration, the signals received by $S_1$ and $S_2$ will have an initial transient component, a steady state component, and a final transient component. It can be shown that the duration of the steady state component at $S_j$ is equal to $T_0-v_{0j}$, where $v_{0j}$ denotes the delay spread of channel $g_{0j}(t)$. In order to achieve a steady-state response at both $S_1$ and $S_2$, we require $T_0>\max(v_{01}, v_{02})$. The steady-state portion of the beacon received at $S_j$ can then be written as:

$$y_{0j}(t)=\alpha_{0j}\cos(\omega t+\phi_0+\theta_{0j})+\eta_{0j}(t)$$

for $t\epsilon[t_0+\tau_{0j}+v_{0j}, t_0+\tau_{0j}+T_0)$ and $j\epsilon\{1,2\}$. Each source uses only the steady-state portion of its noisy observation in the first timeslot to compute local estimates of the received frequency and phase. The transient portions of the observation are ignored.

The second and third timeslots are as described in the single-path case, with each source transmitting secondary beacons to the other source using the frequency and extrapolated phase estimates obtained from the first timeslot. The phase estimates at each source are extrapolated for transmission of the secondary beacons as periodic extensions of the steady state portion of the primary beacon observations. The only differences with respect to the single path case are that (i) the duration of each secondary beacon must exceed $v_{12}=v_{21}$ in order to ensure a steady-state observation and that (ii) the sources estimate the received frequency and phase of the secondary beacons using only the steady-state portion of the observations.

Other than the foregoing, no other modifications to the present invention are necessary. In the final timeslot, both sources transmit as in Equation 2 above. Assuming unmodulated carriers, the steady-state signal received at the destination during the final timeslot can be written in the same form as Equation 5 above. The net effect of multipath on the synchronization protocol is that the beacons must be transmitted with durations exceeding the delay spread of the appropriate channels and that the duration of the steady-state observations used for phase and frequency estimation are reduced, with respect to single-path channels, by the delay spread of the multipath channels.

Although the events of the present invention are described in terms of some notion of "true time" t, it is worth mentioning that the present invention does not assume that nodes share a common time reference. An essential feature of the present invention is that, in each of the timeslots TS1, TS2, and TS3, each source transmission is simply a periodic extension of a beacon received in a previous timeslot. No absolute notion of "time-zero" is needed since the phase of a source's transmission is extrapolated from the estimated initial phase of the appropriate beacon observation in a previous timeslot. Moreover, each source transmission in timeslots TS1, TS2, and TS3 is triggered by the conclusion of a beacon in a prior timeslot. The sources do not follow any schedule requiring knowledge of "true time."

The fact that sources have imperfect local oscillators also implies that local frequency estimates at each source are relative to the source's clock. Suppose, for example, a source's clock $t'=\gamma t$ runs at rate $\gamma$ with respect to true time t and that the channels are noiseless. A beacon received at true frequency $\omega$ rad/sec will appear to this source to be received at frequency $\hat{\omega}=w/\gamma$. Nevertheless, when the source generates a periodic extension of this signal in a later timeslot, the frequency of the transmission will be equal to the product of the local estimate and the local relative clock rate, i.e. $\omega$. Hence, the present invention does not require the sources to share a common time reference, either in terms of clock rate or phase.

It is also noted that, as long as the half-duplex constraint is not violated, the absolute starting and ending times of each of the timeslots are not critical to the performance of the protocol. Since each source transmission in timeslots TS1, TS2, and TS3 is a periodic extension of a beacon received in a prior timeslot, gaps of arbitrary duration can be inserted between the timeslots without directly affecting the phase offset at the destination during beamforming. Gaps between the timeslots may be needed in practical systems, for example, to account for processing time at the sources and/or transient components of beacons received in multipath. In any case, these gaps do not directly affect the relative phase of the periodic extensions since they essentially delay the window in which the periodic extension is transmitted but do not change the phase or frequency of the periodic extension. As a consequence of this property, the estimate of $\tau_{delay}$ at $S_2$ in TS3 is not critical if the beamforming timeslot is sufficiently long. An inaccurate estimate of $\tau_{delay}$ only causes $S_2$'s carrier to begin slightly earlier or later than the carrier of $S_1$ at D; it does not affect the relative phase of the carriers during beamforming.

The performance of the present invention in terms of the carrier phase offset at the receiver during the beamforming timeslot is now described. In an ideal beamformer, the amplitudes of the received signals add constructively at the destination and $a_{bf}(t)=\alpha_{01}a_{10}+\alpha_{02}a_{20}$. The non-ideal nature of the distributed beamformer is captured in the carrier phase offset $$\phi\Delta(t)=\omega\Delta(t-t_3)+\phi\Delta t\epsilon[t_3,t_3+T_3) \quad \text{(Equation 6)}$$

where $\omega\Delta:=\hat{\omega}_2-\hat{\omega}_1$ represents the linear phase drift during beamforming and $\phi\Delta:=\hat{\omega}_{32}-\hat{\omega}_{31}$ represents the initial phase offset at the start of beamforming. Phase and frequency estimation errors at each source result in unavoidable initial carrier phase offset at the start of TS3 as well as linear phase drift over the duration of TS3. As set forth below, a vector notation for the eight estimation errors of the present invention in the illustrative case (M=2) is established. The joint statistics of these errors are analyzed to facilitate statistical description of the carrier phase offset during beamforming.

In the time-slotted round-trip carrier synchronization protocol, each source generates a pair of frequency estimates and a pair of phase estimates from the primary and secondary beacon observations. The estimation error vector is defined as $$\tilde{\theta}:=[\tilde{\omega}_{01},\tilde{\omega}_{02},\tilde{\omega}_{12},\tilde{\omega}_{21},\tilde{\phi}_{01},\tilde{\phi}_{02},\tilde{\phi}_{12},\tilde{\phi}_{21}]^\tau$$

where $\tilde{\omega}_{0j}:=\hat{\omega}_{ij}:=\hat{\omega}_{ij}-\hat{\omega}_{0i}$, $\tilde{\phi}_{0j}:=\hat{\phi}_{0j}-\phi_0$, and $\tilde{\phi}_{ij}:=\hat{\phi}_{ij}-\hat{\phi}_i$ for $j\in\{1,2\}$, $i\in\{1,2\}$, and $i\neq j$. Note that the frequency and phase estimation errors $\tilde{\omega}_{0j}$ and $\tilde{\phi}_{0j}$ are defined with respect to the primary beacon frequency and phase transmitted by $D\rightarrow S_j$. The frequency and phase estimation errors $\tilde{\omega}_{ij}$ and $\tilde{\phi}_{ij}$ are defined with respect to the secondary beacon frequency and phase transmitted by $S_i\rightarrow S_j$.

To facilitate analysis, it is assumed that the estimation error vector is Gaussian distributed with zero mean and covariance matrix $\Theta:=E[\tilde{\theta}\tilde{\theta}^\tau]$. Note that the frequency estimation errors are all independent since (i) observations in different timeslots are affected by independent noise realizations and (ii) observations at $S_1$ and $S_2$ are affected by independent noise realizations. This is also true of the phase estimates. The frequency and phase estimates obtained from the same observation, however, are not independent. Hence, all of the off-diagonal elements of the covariance matrix are equal to zero except for the terms $\text{cov}[\tilde{\omega}_{ij},\tilde{\phi}_{ij}]$ for $i,j\in\{1,2\}$.

The variances on the diagonal of $\Theta$ and the covariances on the off-diagonals of $\Theta$ can be lower bounded by the Cramer-Rao bound (CRB). Given a sinusoid of amplitude a in white noise with $$PSD\frac{N_0}{2},$$

the variances and covariance of the frequency and phase estimates can be lower bounded by Equation 8 below:

$$\sigma_\omega^2 \geq \frac{12\sigma^2 f_s^2}{a^2 N(N^2-1)} \quad \text{(Equations 7-9)}$$

$$\sigma_\phi^2 \geq \frac{2\sigma^2(2N-1)}{a^2 N(N+1)}$$

$$\text{cov}\{\tilde{\omega},\tilde{\phi}\} \geq \frac{-6\sigma^2 f_s}{a^2 N(N+1)}$$

where $\sigma^2$ is the variance of the uncorrelated real and imaginary components of the independent, identically distributed, zero-mean, complex Gaussian noise samples, T is the duration of the observation, $f_s$ is the sampling frequency, and N is the number of samples in the observation.

Since each source has a pair of unbiased frequency estimates prior to the start of beamforming, the phase drift during beamforming can be reduced by generating the carrier at $S_j$ from a linear combination of the local estimates, i.e., $$\hat{\omega}_j = \mu_j \hat{\omega}_{0j} + (1-\mu_j)\hat{\omega}_{ij}.$$

In this case, the carrier frequency offset during beamforming can be written as $$\omega\Delta := \hat{\omega}_2 - \hat{\omega}_1 = \Gamma_1^\tau \tilde{\theta} \quad \text{(Equation 10)}$$

where $$\Gamma_1 = [1-\mu_1-\mu_2, -(1-\mu_1-\mu_2), 1-\mu_2, -(1-\mu_1), 0, 0, 0, 0]^\tau.$$

It can be shown that the carrier frequency offset $\omega\Delta$ is Gaussian distributed with zero mean for any choice of $\mu_1$ and $\mu_2$ when the frequency estimates are unbiased and Gaussian distributed. A good choice then for the linear combination parameters $\mu_1$ and $\mu_2$ is one that minimizes $\text{var}[\omega\Delta]$. For $j \in \{1,2\}$ and $i \neq j$, the linear combination parameters that minimize the variance can be determined using standard calculus techniques to be:

$$\mu_j^* = \frac{1}{1 + \frac{\sigma_{\tilde{\omega}_{ji}}^2}{\sigma_{\tilde{\omega}_{ij}}^2}\left(\frac{\sigma_{\tilde{\omega}_{01}}^2 + \sigma_{\tilde{\omega}_{02}}^2}{\sigma_{\tilde{\omega}_{01}}^2 + \sigma_{\tilde{\omega}_{02}}^2 + \sigma_{\tilde{\omega}_{ji}}^2}\right)}$$

From Equations 3 and 4 above, the carrier phase offset at the start of beamforming can be written as:

$$\phi\Delta = [\hat{\phi}_{12} + \hat{\omega}_{12}(t_{32} - (t_1 + \tau_{12}))] - [\hat{\phi}_{21} + \hat{\omega}_{21}(t_{31} - (t_2 + \tau_{12}))] \quad \text{(Equation 11)}$$

The secondary beacon frequency estimates $\hat{\omega}_{21}$ and $\hat{\omega}_{12}$ can be written as:

$$\hat{\omega}_{21} = \hat{\omega}_{02} + \tilde{\omega}_{21} = \omega + \tilde{\omega}_{02} + \tilde{\omega}_{21} \text{ and}$$

$$\hat{\omega}_{12} = \hat{\omega}_{01} + \tilde{\omega}_{12} = \omega + \tilde{\omega}_{01} + \tilde{\omega}_{12}$$

and the phase estimate $\hat{\phi}_{12}$ can be written as:

$$\hat{\phi}_{12} = \hat{\omega}_{01} T_0 + \hat{\phi}_{01} + \tilde{\phi}_{12} = (\omega + \tilde{\omega}_{01}) T_0 + \phi_0 + \tilde{\phi}_{01} + \tilde{\phi}_{12}$$

where $\tilde{\phi}_{01}$ is the primary beacon phase estimation error at $S_1$ and $\tilde{\phi}_{12}$ is the secondary beacon phase estimation error at $S_2$. Similarly, the phase estimate $\hat{\phi}_{21}$ can be written as $$\hat{\phi}_{21} = \hat{\omega}_{02}(\tau_{01} + \tau_{12} - \tau_{02} + T_0 + T_1) + \hat{\phi}_{02} + \tilde{\phi}_{21}$$

$$= (\omega + \tilde{\omega}_{02})(\tau_{01} + \tau_{12} - \tau_{02} + T_0 + T_1) + \phi_0 + \tilde{\phi}_{02} + \tilde{\phi}_{21}.$$

Letting $\Psi := t_{32} - (t_1 \tau_{12}) = \tau_{01} + \tau_{12} - \tau_{02} + T_1 + T_2$ and noting that $t_{31} - (t_2 + \tau_{12}) = T_2$, we can plug these results into Equation 11 to get:

$$\phi\Delta = \Gamma_2^\tau \tilde{\theta} \quad \text{(Equation 12)}$$

where $\Gamma_2 = [\Psi + T_0, -(\Psi + T_0), \Psi, -T_2, 1, -1, 1, -1]^\tau$.

Plugging Equations 10 and 12 into Equation 6, the phase offset during beamforming can be expressed in terms of the estimation error vector as:

$$\phi\Delta(t) = [(t-t_3)\Gamma_1 + \Gamma_2]^\tau \tilde{\theta} \quad t \in [t_3, t_3 + T_3).$$

Since $(t-t_3)\Gamma_1$ and $\Gamma_2$ are deterministic and the estimation error vector is assumed to be Gaussian distributed with zero mean, then $E[\phi\Delta(t)] \sim \mathcal{N}(0, \sigma_{\phi\Delta(t)}^2)$ at any $t \in [t_3, t_3 + T_3)$. The variance of the phase offset can be written as:

$$\sigma_{\phi\Delta(t)}^2 = [(t-t_3)\Gamma_1 + \Gamma_2]^\tau \Theta[(t-t_3)\Gamma_1 + \Gamma_2] \quad \text{(Equation 13)}$$

for any $t \in [t_3, t_3 + T_3)$. This result can be used to quantify the amount of time that the distributed beamformer provides an acceptable level of carrier phase alignment with a certain level of confidence. At any time $t \in [t_3, t_3 + T_3)$, the probability that the absolute carrier phase offset is less than a given threshold $\lambda$ can be written as:

$$\text{Prob}[|\phi\Delta(t)| < \lambda] = 1 - 2Q(\sigma_{\phi\Delta(t)}\lambda) \quad \text{(Equation 14)}$$

where $Q(x) = \sqrt{2\pi}^{-1} \int_x^\infty \exp(-t^2/2) dt$. The CRB results of Equations 7-9 can be used to provide a lower bound on the variance of the phase offset during beamforming and, as such, an upper bound on $\text{Prob}[|\phi\Delta(t)| < \lambda]$.

In addition to phase and frequency offsets that occur as a consequence of imperfect estimation, practical oscillators also exhibit phase noise. Oscillator phase noise can cause the phase of each carrier to randomly wander from the intended phase during beamforming and can establish a ceiling on the reliable beamforming time, i.e. the time at which the phase offset between the carriers drifts beyond an acceptable threshold, even in the absence of estimation error.

Oscillator phase noise is denoted as $\chi_i(t)$ at $S_i$ and is modeled as a non-stationary Gaussian random process with zero mean and variance increasing linearly with time from the start of beamforming, i.e. $\sigma_{\chi_i}^2(t) = r(t-t_3)$ for $t \in [t_3, t_3 + T_3)$ where the variance parameter $r$ is a function of the physical properties of the oscillator including its natural frequency and physical type. It is assumed that $\chi_1(t)$ and $\chi_2(t)$ share the same value of $r$ but are independent phase noise processes. Typical values of $r$ for low-cost radio-frequency oscillators range from 1 to 20 rad²·Hz.

The phase offset during beamforming in terms of the estimation error vector and phase noise processes can be expressed as $$\phi\Delta(t) = [(t-t_3)\Gamma_1 + \Gamma_2]^\tau \tilde{\theta} + \chi_1(t) - \chi_2(t)$$

for $t \in [t_3, t_3 + T_3)$. Note that $\Gamma(t-t_3) := (t-t_3)\Gamma_1 + \Gamma_2$ is deterministic. Under the assumption that the estimates are unbiased, Gaussian distributed, and independent of the mutually independent phase noise processes at each source, we can say that $\phi\Delta(t) \sim \mathcal{N}(0, \sigma_{\phi\Delta(t)}^2)$ where $$\sigma_{\phi\Delta(t)}^2 = \Gamma^\tau(t-t_3)\Theta\Gamma(t-t_3) + 2r(t-t_3) \quad \text{(Equation 15)}$$

at any $t \in [t_3, t_3 + T_3)$. This result can be used to quantify the amount of time that the distributed beamformer provides an acceptable level of carrier phase alignment with a certain level of confidence. At any time $t \in [t_3, t_3 + T_3)$, the probability that the absolute carrier phase offset is less than a given threshold $\lambda$ can be written as $$\text{Prob}[|\phi_\Delta(t)| < \lambda] = 1 - 2Q\left(\frac{\lambda}{\sigma_{\phi_\Delta}(t)}\right) \quad \text{(Equation 16)}$$

where $$Q(x) = \frac{1}{\sqrt{2\pi}} \int_x^\infty \exp(-t^2/2) dt.$$

The CRB can also be used to provide a lower bound on the variance of the phase offset during beamforming and, as such, an upper bound on the probability that the absolute carrier phase offset is less than a given threshold.

Described now are numerical examples of the present invention in single-path time-invariant channels. The examples in this section assume that all beacons are received at an SNR of $$10\log_{10}\left(\frac{a^2}{2\sigma^2}\right) = 20 \text{ dB}$$

and that each channel has a random propagation delay. The primary beacon frequency is $\omega = 2\pi \cdot 900 \cdot 10^6$ rad/second the oscillator phase noise variance parameter is assumed to be $r=20$ rad$^2 \cdot$Hz.

Figure 4:
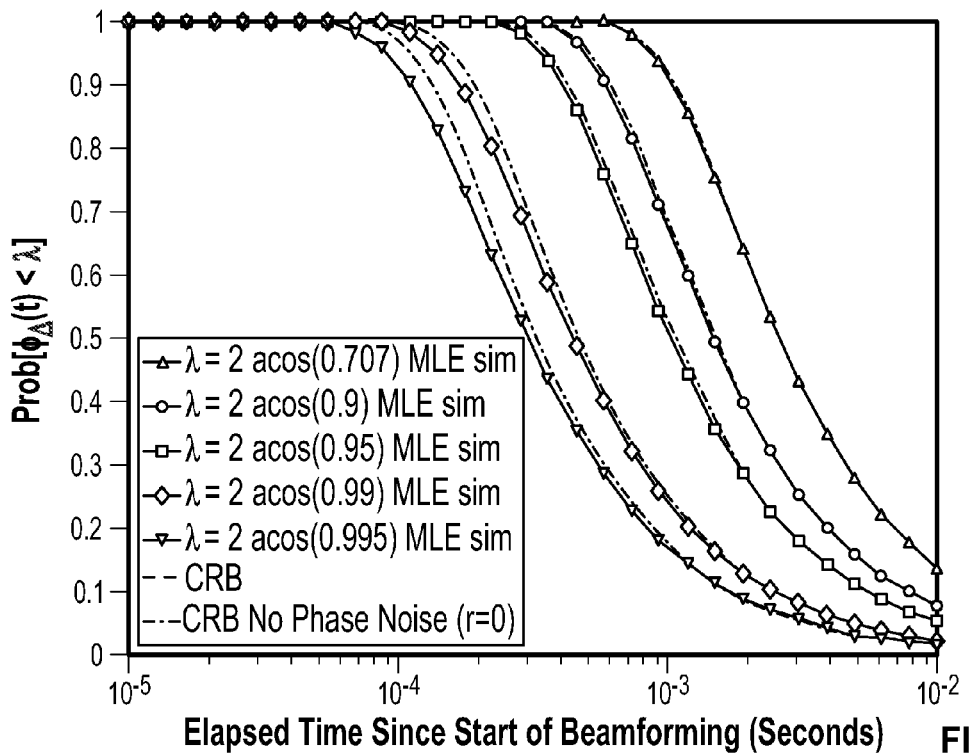
FIGS. 4-6 are graphs showing performance statistics relating to the present invention.

The first example shows how the beamforming quality degrades as the duration of the beamforming interval $TS_3$ increases (for fixed beacon durations) and gives a sense of how often the sources will require resynchronization to maintain acceptable beamforming quality. FIG. 4 plots Prob$[|\phi\Delta(t)|<\lambda]$ versus elapsed time from the start of beamforming when the primary beacon duration is fixed at $T_0=1$ μs and the secondary beacon durations are fixed at $T_1=T_2=2$ μs. Both sources generate carrier frequencies for beamforming with the optimum linear combining factors $\mu^*_1 = \mu^*_2 \approx 0.5152$ in this case. A Monte Carlo simulation with 50,000 iterations was performed to obtain estimates of Prob$[|\phi\Delta(t)|<\lambda]$ where, for each new realization of the random parameters, both sources generate maximum likelihood phase and frequency estimates of their noisy observations and use these estimates to generate periodic extensions in the appropriate timeslots. The quality thresholds in FIG. 4 represent the ratio of received power of the distributed beamformer to that of an ideal beamformer in the sense that $\lambda = 2 \cos^{-1}(u)$ and $|\phi\Delta(t)|<\lambda$ implies that the received power of the distributed beamformer at time t is no worse than $u^2$ times that of an ideal beamformer, where $0 < u < 1$. The value of $$u = \frac{1}{\sqrt{2}}$$

represents the "break-even" case where the distributed beamformer has the same power efficiency as orthogonal transmission, i.e. the carriers are received with 90 degrees of phase offset.

The results in FIG. 4 show that the carrier phases are closely aligned at the destination with high probability up to $t - t_3 \approx 50$ μs. By $t - t_3 = 3$ ms, however, the probability of having carrier phase alignment such that beamforming is more power efficient than orthogonal transmission is less than ½. Hence, depending on the quality threshold and the confidence in which the threshold must be satisfied, these results show that the distributed beamformer must be periodically resynchronized in order to maintain an acceptable level of performance with high confidence.

In addition to the Monte Carlo simulations, FIG. 4 also plots an upper bound for Prob$[|\phi\Delta(t)|<\lambda]$ using the CRB results discussed above to the lower bound set forth in Equation 15. The close match of the experimental and analytical results shows that, as might be expected, the CRB can be used to efficiently predict the performance of the two-source timeslotted round-trip carrier synchronization system when the sources use maximum likelihood phase and frequency estimation. The CRB without phase noise, i.e. $r=0$, is plotted to also show the effect of phase noise on the expected beamforming time. In these results, since the synchronization timeslots are short, the phase drift due to the phase and frequency estimation errors tends to dominate the effect of the phase noise.

Figure 5:
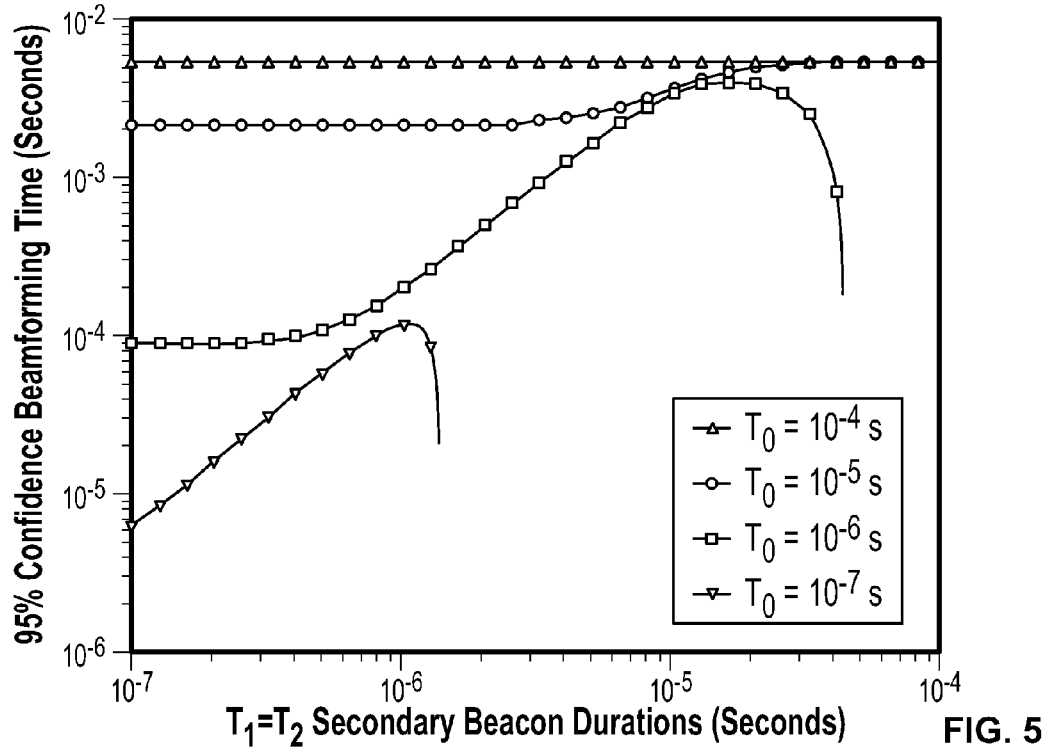

The second example considers the effect of the beacon durations on how long acceptable beamforming quality can be maintained at a desired level of confidence. FIG. 5 plots the 95% confidence beamforming time given a 90%-ideal beamforming quality threshold ($\lambda = 2 \cos^{-1}(0.9)$ and Prob$[|\phi\Delta(t)|<\lambda] = 0.95$) using the CRB analytical predictions. All other parameters are identical to FIG. 4. The results in FIG. 5 show two regimes of operation. In the short-beacon regime, the phase and frequency estimation errors dominate the phase noise. In this regime, the 95% confidence beamforming times are approximately flat with respect to the secondary beacon duration when the secondary beacon durations are significantly shorter than the primary beacon duration. When the secondary beacon durations begin to exceed the primary beacon duration, the 95% confidence beamforming times increase at a rate proportional to the secondary beacon durations. If the secondary beacon durations become too long, however, the 95% confidence beamforming time quickly drops to zero. This is due to the fact that the extrapolated phase estimates from the primary beacon become increasingly inaccurate for longer secondary beacon durations.

In the long-beacon regime, the oscillator phase noise dominates the phase and frequency estimation errors. When operating in this regime, the 95% confidence beamforming time is flat with respect to the primary and secondary beacon durations. In FIG. 5, the phase noise establishes a 95% confidence beamforming time ceiling at approximately 5 ms. This ceiling is achieved when $T_0 = 10^{-4}$ or when $T_0 = 10^{-5}$ and $T_1 = T_2 > 2 \cdot 10^{-5}$. These results intuitively suggest that beacon durations should be selected to be long enough such that the estimation error does not dominate but also short enough such that phase noise does not dominate.

Figure 6:
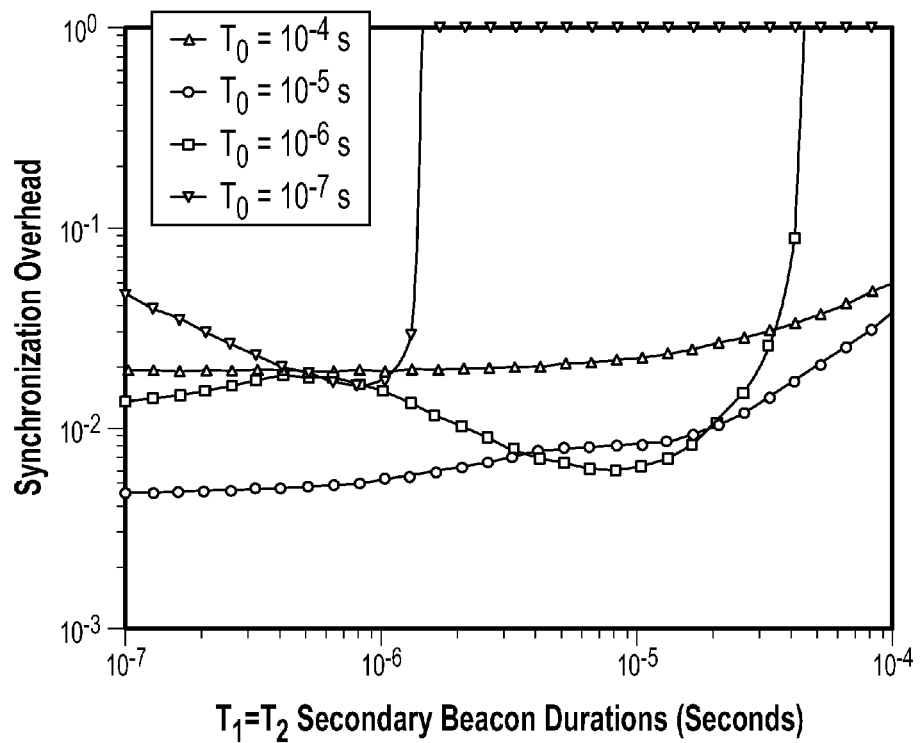

FIG. 6 plots the synchronization overhead of the two-source round-trip protocol under the same conditions as in FIG. 5. We define synchronization overhead as the fraction of total time spent synchronizing the sources ignoring propagation delays, i.e.

$$\text{synchronization overhead} := \frac{T_0 + T_1 + T_2}{T_0 + T_1 + T_2 + T_3}.$$

The beacon durations $T_0$, $T_1$ and $T_2$ are design parameters, but the beamforming duration $T_3$ is computed from the CRB analytical predictions assuming a a 90%-ideal beamforming quality threshold ($\lambda = 2 \cos^{-1}(0.9)$) at 95% confidence. The results in FIG. 6 show that a synchronization overhead of less than 1% can be achieved by selecting beacon durations such as $T_0 = 10^{-5}$ and $T_1 = T_2 = 10^{-7}$ or $T_0 = 10^{-6}$ and $T_1 = T_2 = 8 \cdot 10^{-6}$. In both cases, the beacon durations are short enough to avoid operation in the phase-noise dominated regime but also long enough to avoid excessive estimation error. An important conclusion from these results is that the synchronization overhead can be small when the beacon durations are selected such that the phase drift due to estimation error is balanced with the phase noise.

Figure 7:
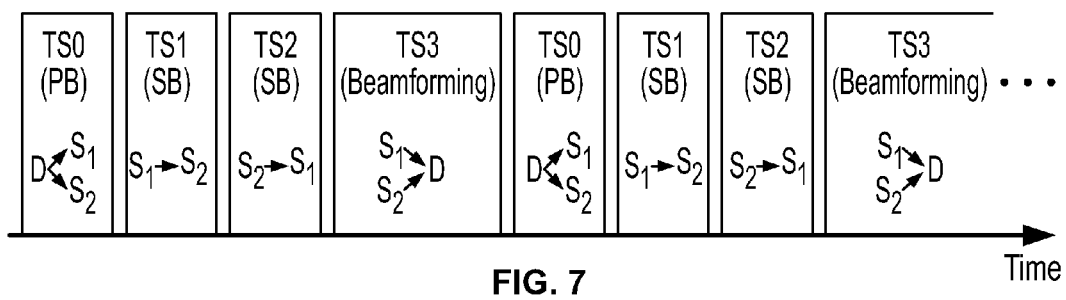
FIG. 7 is a diagram showing timeslot sequences and associated signaling steps implemented by the present invention.

FIG. 7 is a diagram showing the sequence of timeslots TS0-TS3 over time, as carried out by the present invention. As can be seen, synchronization of the phases and frequencies of the sources S1 and S2 first occurs in timeslots TS0-TS2 as described above. Then, in timeslot TS3, beamforming between the sources S1 and S2 to destination D occur, so that information is transmitted from the sources S1 and S2 to the destination D with synchronized phases and frequencies. The labels "PB" and "SB" refer, respectively, to primary and secondary beacon signals. The process is then repeated for subsequent transmissions of information from sources S1 and S2. The process can be implemented as timeslots in any conventional, multi-user wireless communication system, such as an OFDMA wireless system.

Figure 8:
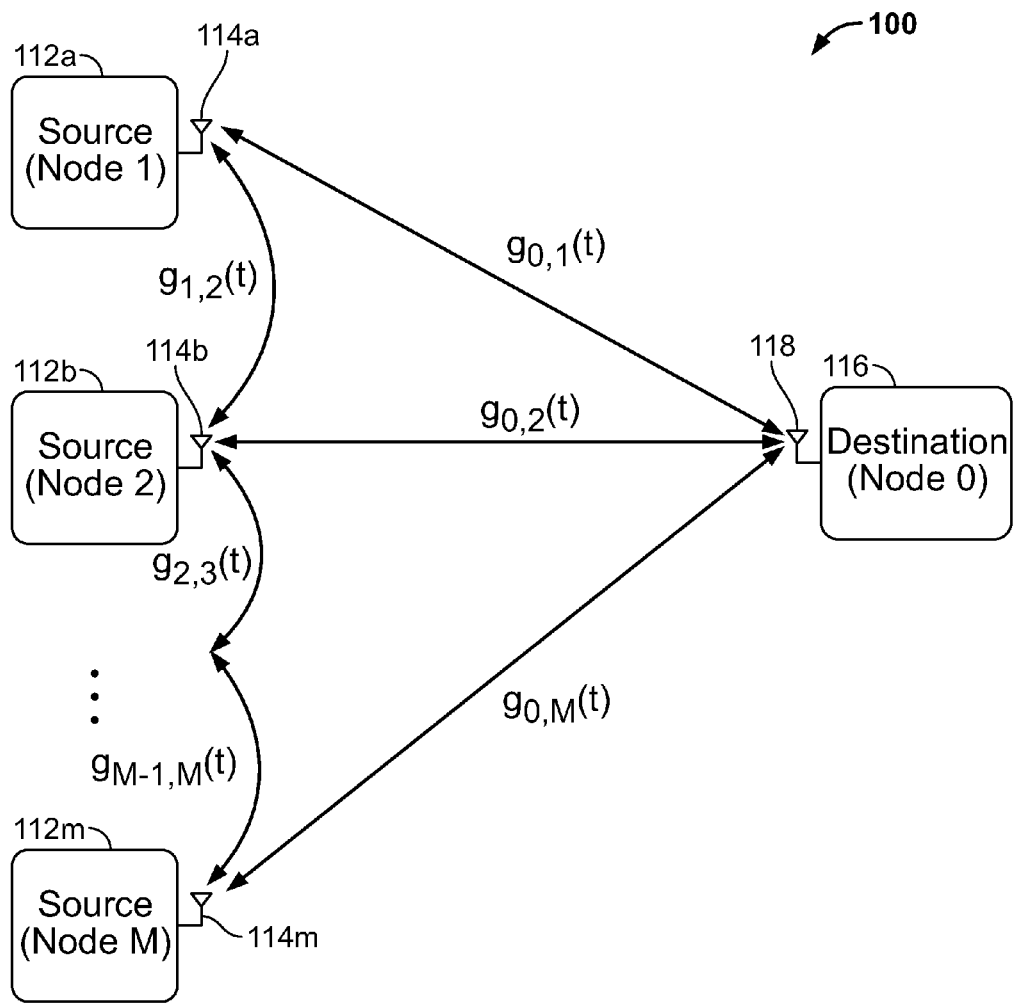
FIG. 8 is a diagram showing a general M>1 source wireless communications system in which the present invention can be implemented for synchronizing phases and frequencies.

The present invention can be implemented in wireless communications systems having any number of M>1 source nodes, to allow for synchronization of phase and frequency of such nodes. Such an arrangement is shown in FIG. 8, which is a model of a multi-user wireless communications system 100 having M source nodes 112a-112M, each with a respective single antenna 114a-114M, and a destination node 116 having a single antenna 118. As discussed hereinbelow, a pair of source nodes selected from any of the source nodes 112a-112M is referred to as source nodes S1 and S2 (or, $S_1$ and $S_2$).

As shown in FIG. 8, the channel from node i to node j is modeled as a linear time-invariant (LTI) system with impulse response $g_{i,j}(t)$. The noise in each channel is additive, white, and Gaussian and the impulse response of each channel in the system is assumed to be reciprocal in the forward and reverse directions, i.e., $g_{i,j}(t)=g_{j,i}(t)$. It is assumed that all M sources have identical information to transmit to the destination.

In a distributed beamforming system with M>2 sources, the time-slotted round-trip carrier synchronization protocol has a total of 2M timeslots denoted as $TS_0, \ldots TS_{2M-1}$. The first 2M-1 timeslots are used for the transmission of synchronization beacons and the final timeslot is used for beamforming. The basic concepts of two-source synchronization apply here with additional synchronization timeslots and minor modifications in the calculation of the transmission phase for source nodes $S_2, \ldots, S_{M-1}$ shown in FIG. 8. The activity in each timeslot is summarized below:

1. In $TS_0$ the destination transmits the sinusoidal primary beacon to all M sources. Each source generates local phase and frequency estimates from its observation.
2. In $TS_i$ for $i=1, \ldots, M-1$, $S_i$ transmits a sinusoidal secondary beacon to $S_{i+1}$. The secondary beacon transmitted by $S_i$ in $TS_i$ is a periodic extension of the beacon received in $TS_{i-1}$. $S_{i+1}$ generates local phase and frequency estimates from this observation.
3. In $TS_M$, $S_M$ transmits a sinusoidal secondary beacon to $S_{M-1}$. This secondary beacon is transmitted as a periodic extension of the primary beacon received by $S_M$ in $TS_0$, with initial phase extrapolated from the phase and frequency estimates obtained by $S_M$ in $TS_0$. $S_{M-1}$ generates local phase and frequency estimates from this observation.
4. In $TS_i$ for $i=M+1, \ldots, 2M-2$, $S_{2M-i}$ transmits a sinusoidal secondary beacon to $S_{2M-i}$. The secondary beacon transmitted by $S_{2M-i}$ in $TS_i$ is a periodic extension of the secondary beacon received in $TS_{i-1}$. $S_{2M-i}$ generates local phase and frequency estimates from this observation.
5. In $TS_{2M-1}$, all M sources transmit simultaneously to the destination as a distributed beamformer. The frequency and initial phase of the carrier transmitted by each source is based only on the local phase and frequency estimates obtained in the prior timeslots.

Since, like the two-source case, the total phase shift of the $D\to S_1\to S_2\to \ldots \to S_M\to D$ and the $D\to S_M\to S_{M-1} \ldots \to S_1\to D$ circuits are identical, distributed beamforming between source nodes $S_1$ and $S_M$ can be achieved by following the round-trip protocol and transmitting secondary beacons as periodic extensions of previously received beacons in the same manner as described above. The only difference is that the secondary beacons propagate between $S_1$ and $S_M$ with multiple hops when M>2, rather than via direct propagation in the two-source case. When M>2, however, nodes $S_2, \ldots, S_{M-1}$ must also derive appropriate transmission phases to participate in the distributed beamformer.

Under the assumption that all of the channels in FIG. 8 are time-invariant, and ignoring estimation errors to ease exposition, the round-trip nature of the protocol and the transmission of periodic extensions implies that the destination will receive carriers from $S_1$ and $S_M$ at a phase (relative to the phase of the primary beacon) of:

$$\theta^{rt}=\theta_{0,1}+\theta_{1,2}+\ldots+\theta_{M-1,M}+\theta_{M,0}$$

where $\theta_{k,i}$ denotes the phase of the LTI single-path channel $g_{k,i}(t)$. Let S denote the set of source nodes $S_m$ for $m\in\{2, \ldots, M-1\}$. In order for source node $S_m\in S$ to transmit a carrier that arrives at the destination with the same phase as $S_1$ and $S_M$, $S_m$ must transmit its carrier with phase $\theta^{rt}-\theta_{m,0}$.

Source node $S_m\in S$ receives three transmissions during the synchronization phase of the protocol: a primary beacon in $TS_0$ at phase $\theta_{0,m}=\theta_{m,0}$, a secondary beacon during the counterclockwise (in the context of FIG. 8, $S_1\to S_2\to \ldots \to S_M$ is counterclockwise propagation and $S_M\to S_{M-1} \ldots \to S_1$ is clockwise propagation around the circuit including D) propagation of beacons in $TS_{m-1}$ at phase $\theta_m^\downarrow=\theta_{0,1}+\theta_{1,2}+\ldots+\theta_{m-1,m}$ and another secondary beacon during the clockwise propagation of beacons in $TS_{2M-m-1}$ at phase $\theta_m^\uparrow=\theta_{0,M}\theta_{M,M-1}+\ldots+\theta_{m+1,m}$. Since each node in the system estimates the phase of received beacons relative to its own local time reference, absolute estimates of $\theta_m^\uparrow$ and $\theta_m^\downarrow$ at $S_m$ will both have an unknown phase offset that depends on the phase of the local time reference at $S_m$. To avoid the problem of determining this unknown phase offset, $S_m$ can calculate the phase difference between any two phases that were measured under the same local time reference and effectively cancel the offsets. Accordingly, $S_m$ can calculate the phase difference between each secondary beacon phase estimate and the primary beacon phase estimate as $$\delta_m^\uparrow=\theta_m^\uparrow-\theta_{0,m}$$

$$\delta_m^\downarrow=\theta_m^\downarrow-\theta_{0,m}.$$

Since the unknown local phase offset has been canceled in the phase differences $\delta_m^\uparrow$ and $\delta_m^\downarrow$, the sum of these terms will also not have any unknown phase offset. Hence, if $S_m$ transmits its carrier as a periodic extension of the primary beacon received in $TS_0$ with an additional phase shift of $\delta_m^\uparrow+\delta_m^\downarrow$, the carrier phase of $S_m$ can be written as:

$$\phi_m=\theta_{0,m}+\delta_m^\uparrow+\delta_m^\downarrow=\theta^{rt}-\theta_{0,m}$$

which is the desired phase for beamforming since $\theta_{0,m}=\theta_{m,0}$. After propagation through channel $g_{m,0}(t)$, the carrier from $S_m\in S$ arrives at the destination with phase $\theta^{rt}$ and constructively combines with the carriers from $S_1$ and $S_M$.

In the round-trip synchronization protocol for M>2 sources, we note that the secondary beacons transmitted by $S_m$ are only used by $S_{m+1}$ or $S_{m-1}$, depending on the timeslot in which the beacon is transmitted. The other sources in the system (and the destination) ignore these transmissions. While more efficient protocols exploiting the broadcast nature of the wireless links between the sources and requiring less than 2M-1 synchronization timeslots may be possible, the round-trip synchronization protocol possesses the property that the number of synchronization timeslots is linear in M.

As discussed above, although the events of the present invention are described in terms of some notion of "true time"

t, it is worth reiterating that the protocol of the present invention does not assume that nodes share a common time reference. In each of the timeslots $TS_1, \ldots, TS_{M-1}$, each source transmission is simply a periodic extension of a beacon received in a previous timeslot. In the case of M>2 sources, source nodes $S_2, \ldots, S_{M-1}$ must also compute a phase offset for their carrier to arrive at the correct phase, but the carriers of these source nodes are each transmitted as a periodic extension of the primary beacon received in $TS_0$ with a phase shift computed from two local phase differences. No absolute notion of "time-zero" is needed since the phase of each source transmission is extrapolated from the estimated initial phase of the appropriate beacon observation in a previous timeslot. Moreover, each source transmission in timeslots $TS_1, \ldots, TS_{M-1}$ is triggered by the conclusion of a beacon in a prior timeslot. The sources do not follow any schedule requiring knowledge of "true time."

Since each source transmission in the present invention is intended to be a periodic extension of a beacon received in a previous timeslot, it is noted that each source could realize its phase and frequency estimation functions during the synchronization timeslots by using phase-locked loops (PLLs) with holdover circuits. Since beacons are transmitted for only finite durations in the time-slotted protocol, holdover circuits are necessary to prevent tracking of incorrect beacons or noise. We note that each source requires as many PLLs as received beacons in order to "store" all of its local phase and frequency estimates. In the time-slotted synchronization protocol with M>2, this implies that a source may require as many as three PLLs, depending on whether or not it is an "end node", i.e. $S_1$ or $S_M$, or an "interior node", i.e., $S_2, \ldots, S_{M-1}$.

It is also pointed out that, as long as the half-duplex constraint is not violated, the absolute starting and ending times of each of the timeslots are not critical to the performance of the protocol. Since each source transmission in timeslots $TS_1, \ldots, TS_{M-1}$ is a periodic extension of a beacon received in a prior timeslot, gaps of arbitrary duration can be inserted between the timeslots without directly affecting the phase offset at the destination during beamforming. Gaps between the timeslots may be needed in practical systems, for example, to account for processing time at the sources and/or transient components of beacons received in multipath. In any case, these gaps do not directly affect the relative phase of the periodic extensions since they essentially delay the window in which the periodic extension is transmitted but do not change the phase or frequency of the periodic extension. As a consequence of this property for the case when M=2 sources, the estimate of $\tau_{delay}$ at $S_2$ in $TS_3$ is not critical if the beamforming timeslot is sufficiently long. An inaccurate estimate of $\tau_{delay}$ only causes $S_2$'s carrier to arrive slightly earlier or later than $S_1$'s carrier at D; it does not affect the relative phase of the carriers during beamforming. The same intuition applies to the case of M>2 sources.

The indirect effect of gaps between the timeslots is that the extrapolated phase estimates will tend to become less accurate as the duration of the gaps increases. This is due to the fact that the gaps cause more time to elapse between the observation and the start of the periodic extension transmission, magnifying the effect of frequency estimation error and/or phase noise. Hence, while the phase offset of the carriers at the destination during beamforming is not directly affected by the absolute starting and ending times of each timeslot, better performance can be achieved when any gaps between the timeslots are minimized.

The effects of mobility (e.g., movement of one or more nodes) and Doppler shift on the performance of the present invention were studied, and techniques for compensating for same are now discussed. Since each of the three channels in the system are accessed in both directions at different times, mobility may lead to phase and frequency offset at the destination during beamforming even in the absence of phase and frequency estimation error at the sources. While the focus here is on the scenario with M=2 sources, the ideas developed in this section also apply to the M>2 source scenario.

In order to isolate the effect of mobility on the two-source distributed beamformer, considered was a system with noiseless single-path channels and perfect oscillators, i.e. no phase noise. In this scenario, the sources are able to perfectly estimate the phase and frequency of their primary and secondary beacon observations. We assume a constant velocity mobility model where, in D's reference frame, $S_1$ and $S_2$ are moving with constant velocity $v_i \leq v$ for $i \in \{1,2\}$, where v is the maximum source velocity and $v/c \ll 1$. While this constant bounded velocity assumption may appear to be somewhat restrictive, it is reasonable in the regime where the synchronization timeslots are short. Any acceleration that occurs in a timeslot will result in a relatively small velocity change if the timeslot is short.

$S_1$ and $S_2$ begin transmission of their carriers in $TS_3$ at times $t_{31}$ and $t_{32}$, respectively. The resulting arrival time difference at the destination can be written as $$\tau_\Delta = t_{31} + \tau_{10}(t_{31}) - (t_{32} + \tau_{20}(t_{32}))$$
$$= \tau_{10}(t_{31}) - \tau_{01}(t_0 + T_0) + \tau_{21}(t_2 + T_2) -$$
$$\tau_{12}(t_1) + \tau_{02}(t_0 + T_0) - \tau_{20}(t_{32})$$

where $\tau_{ki}(t)$ denotes the propagation time of an impulse emitted from transmitter k to receiver i at time t. If the carriers from $S_1$ and $S_2$ are both transmitted at frequency $\omega$, the arrival time difference results in a carrier phase offset at the start of beamforming of $\phi\Delta = \omega\tau_\Delta$.

Applying the bound for $|\tau\Delta|$ developed as discussed below, one can bound the initial carrier phase offset as $$|\phi\Delta| \leq \omega\beta[9t_p + 8T_1] \qquad \text{(Equation 17)}$$

where $\beta := v/c \ll 1$, $t_p$ denotes the maximum propagation delay over all links in the system, and where we have assumed that the secondary beacon durations are identical ($T_1 = T_2$). As a numerical example of the bound, consider a system with a 900 MHz carrier frequency and secondary beacon durations $T_1 = T_2 = 2$ μs. Suppose the maximum velocity of each source is set to v=100 meters/sec and the maximum propagation time is set to $t_p = 1$ μs, corresponding to a maximum distance between any two nodes of 300 meters. From Equation 17, the maximum initial carrier phase offset can be computed to be $|\phi\Delta| \leq 0.0471$ radians, or about 2.7 degrees.

Figure 9:
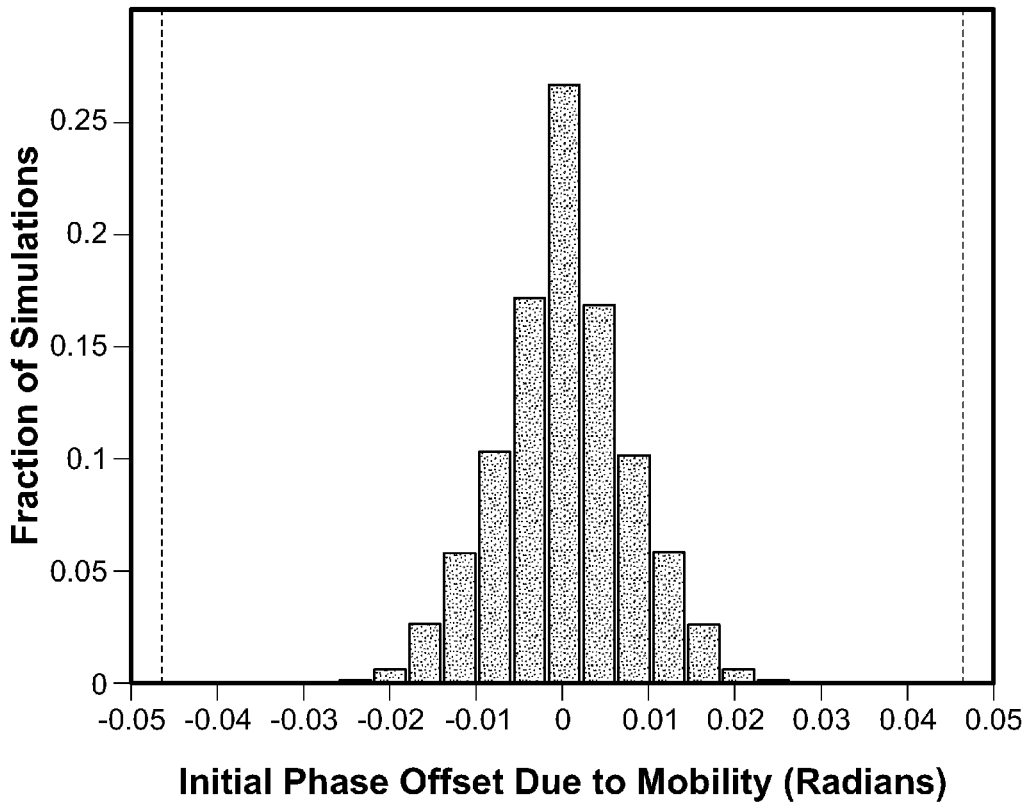
FIG. 9 is an initial carrier phase offset histogram showing the actual phase offset obtained by the present invention.

FIG. 9 is an initial carrier phase offset histogram showing the actual phase offset obtained from 20,000 random realizations of the present invention. The analytical bound is also shown in dotted lines.

In addition to an initial carrier phase offset $\phi\Delta$ at the start of beamforming, mobility may also result in frequency offset $\omega\Delta$ during beamforming due to Doppler shifts in each link. Before analyzing the behavior of the round-trip system, we first consider an exchange of short sinusoidal beacons between two nodes denoted by A and B. Suppose B transmits the first beacon. In A's reference frame, B is moving at constant velocity $v_B$ and is separating from A at the rate $v_B \cos\theta_{BA}$ where $\theta_{BA}$ is the angle of B's motion with respect to the line from A to B. When a beacon is transmitted from A to B, in B's reference frame, the geometry is the same as before except that now A is moving at constant velocity $v_A = v_B$ and is separating from B at the rate $v_A \cos\theta_{AB}$ where $\theta_{AB}$ is defined in the same way as $\theta_{BA}$. We can write the ratio of the Doppler shifts as $$\rho := \frac{\text{Doppler}(B \to A)}{\text{Doppler}(A \to B)} = \frac{1 + \frac{v_B}{c}\cos\theta_{BA}}{1 + \frac{v_A}{c}\cos\theta_{AB}}$$

Since the beacons between A and B were not transmitted simultaneously, it cannot be assumed that $\theta_{AB} = \theta_{BA}$. Nevertheless, when the elapsed time between transmissions is short, we can expect any difference in the angles to be small. Suppose that we can bound the difference of the angles such that $|\theta_{BA} - \theta_{AB}| \leq \epsilon$. Then we can bound the range of $\rho$ as $$\rho \in \begin{bmatrix} \frac{1 - \frac{v}{c}\sin(\epsilon/2)}{1 + \frac{v}{c}\sin(\epsilon/2)}, \\ \frac{1 + \frac{v}{c}\sin(\epsilon/2)}{1 - \frac{v}{c}\sin(\epsilon/2)} \end{bmatrix} \subset \begin{bmatrix} \frac{1 - \beta\epsilon/2}{1 + \beta\epsilon/2}, \\ \frac{1 + \beta\epsilon/2}{1 - \beta\epsilon/2} \end{bmatrix} \approx \begin{bmatrix} 1 - \beta\epsilon, \\ 1 + \beta\epsilon \end{bmatrix}$$

where $v$ is the maximum source velocity, $\beta := v/c \ll 1$, and the approximation results from discarding the insignificant higher order terms in the series representation of the ratio.

In the present invention, beacons are transmitted around the $D \to S_1 \to S_2 \to D$ and $D \to S_2 \to S_1 \to D$ circuits. The Doppler shift, i.e. the ratio of the output to input frequency, in the $g_{k,i}(t)$ channel is denoted as $\gamma k, i$. Focusing on propagation through the first circuit, the frequency of the primary beacon received by $S_1$ can be written as $\omega 01 = \gamma 0,1 \omega$. Since the secondary beacon transmitted by $S_1$ is a periodic extension of this primary beacon, the secondary beacon transmitted by $S_1$ will be received by $S_2$ at frequency $\omega 12 = \gamma 1,2 \omega 01 = \gamma 1,2 \gamma 0,1 \omega$. And finally, since $S_2$ will transmit its carrier as a periodic extension of this secondary beacon, the carrier from $S_2$ will be received by D at frequency $\omega 20 = \gamma 2,0 \gamma 1,2 \gamma 0,1 \omega$. A similar analysis can be applied to the second circuit.

When the sources are moving with constant velocity, each circuit incurs a composite Doppler shift that is the product of the individual Doppler shifts in each link. If we bound the absolute difference of the angles of all of the forward and reverse links in the round-trip synchronization system by $\epsilon$, the previous result implies that the ratio of the composite Doppler shifts, i.e.

$$\rho_c := \frac{\text{Doppler}(D \to S_1 \to S_2 \to D)}{\text{Doppler}(D \to S_2 \to S_1 \to D)},$$

is bounded by:

$$\rho_c \in [(1-\beta\epsilon)^2(1-2\beta\epsilon), (1+\beta\epsilon)^2(1+2\beta\epsilon)] \approx [1-4\beta\epsilon, 1+4\beta\epsilon]$$

where we have again discarded the higher order terms in the approximation. Note that the $(1 \pm 2\beta\epsilon)$ terms correspond to the ratio of the Doppler shifts for the secondary beacons exchanged between the sources since a source's velocity relative to the other source is bounded by $2v$. This result implies that the carrier frequency offset during beamforming can be bounded by:

$$|\omega\Delta| \leq 4\beta\epsilon\omega.$$

As a numerical example of the bound, consider a system with a 900 MHz carrier frequency, maximum velocity $v = 100$ m/s, and an angle bound $\epsilon = 0.0175$ radians, corresponding to 1 degree of maximum angle difference between all forward and reverse transmissions. In this case, the maximum carrier frequency offset at the destination can be computed to be $|\omega\Delta| \leq 21$ Hz. This amount of carrier frequency offset is likely to be insignificant in most cases when compared to the frequency offset caused by estimation error as well as the phase noise of typical low-cost radio frequency oscillators.

The foregoing results demonstrate that the present invention can be designed such that even significant levels of mobility have little effect on the performance of the distributed beamformer in single-path channels. For a given carrier frequency, the initial carrier phase offset due to mobility can be reduced to a desired level by limiting the range of the links (and hence limiting the maximum propagation time $t_p$), limiting the maximum source velocity, and/or by transmitting short secondary beacons. Similarly, carrier frequency offset during beamforming due to mobility can be reduced by limiting the change in the velocity angles between forward and reverse accesses of a channel. This can also be achieved by limiting the maximum velocity and/or by using short beacon durations.

In systems with mobility, the selection of beacon durations involves a tradeoff between the carrier phase and frequency offsets caused by mobility and the carrier phase and frequency offsets caused by estimation error at each source. Selecting very short beacon durations can minimize the effects of mobility but lead to high levels of estimation error and unnecessary synchronization overhead. On the other hand, very long beacon durations may result in precise phase and frequency estimates at each source, but significant carrier phase and frequency offsets due to mobility as well as operation in the phase-noise dominant regime. As was the case without mobility, beacon durations should be selected to balance the effect of these impairments.

It is noted that the optimum linear combining parameters derived above to minimize $\text{var}\{\omega\Delta\}$ are, in general, not optimum in systems with Doppler shift. The combining factors $\mu^*_1$ and $\mu^*_2$ were derived for the case when both frequency estimates $\hat{\omega}_{0i}$ and $\hat{\omega}_{ki}$ at $S_i$ are unbiased estimates of $\omega$, as is the case for systems with LTI channels. In systems with time-varying channels and Doppler shifts, however, $\hat{\omega} 0i$ and $\hat{\omega} ki$ may have different biases with respect to the primary beacon frequency $\omega$. If these biases are small with respect to the standard deviation of the frequency estimation errors, the optimum combining factors derived above may still be used with little loss of optimality. On the other hand, if the biases due to Doppler effects are large with respect to the standard deviation of the frequency estimation errors, use of the combining factors derived above may significantly degrade the performance of the beamformer. In this case, the carriers should be generated as periodic extensions of the secondary beacons in order to ensure that the ratio of the composite Doppler shifts in each circuit is close to one.

For a time-slotted round-trip distributed beamformer with two sources, the arrival time difference of the start of the carriers at the destination can be written as $$\tau\Delta = \tau\Delta_{01} + \tau\Delta_{21} + \tau\Delta_{02} \quad \text{(Equation 18)}$$

where $\tau\Delta_{01} := \tau_{10}(t_{31}) - \tau_{01}(t_0 + T_0)$, $\tau\Delta_{21} := \tau_{21}(t_2 + T_2) - \tau_{12}(t_1)$, $\tau\Delta_{02} = \tau_{02}(t_0 + T_0) - \tau_{20}(t_{32})$ and where $\tau_{ki}(t)$ denotes the propagation time of an impulse emitted from transmitter k to receiver i at time t. An upper bound on the magnitude of $\tau\Delta$ can be written as $$|\tau\Delta| \leq |\tau\Delta_{01}| + |\tau\Delta_{21}| + |\tau\Delta_{02}|.$$

Before making this bound more explicit, we note that the required accuracy of the forward and reverse propagation times requires consideration of relativistic effects. For example, in a system with 900 MHz beacons/carriers, a error of 100 ps in a propagation time calculation corresponds to a phase error of more than 30 degrees. To maintain consistency and avoid unnecessary transformations between reference frames, we will take all lengths and times in our analysis to be in the destination's reference frame.

Since the speed of light is constant in any reference frame, an impulse emitted by a stationary or moving source in the destination's reference frame always propagates at velocity c from the perspective of the destination. To provide an example of the fundamental calculation that we use to derive the bound, suppose a receiver is distance $d_0$ from an emitter of an impulse at time $t_0$ and is moving at constant velocity v on a line directly away from the emitter (all lengths and times are in the destination's reference frame). The emitter can be stationary or moving in the destination's reference frame without affecting the analysis. Since the impulse propagates with velocity c and the receiver is moving directly away from the point at which the impulse was emitted at velocity v, the impulse emitted at $t_0$ arrives at the receiver when $$c(t-t_0) = d_0 + v(t-t_0)$$

where the lengths and times are all in destination's reference frame. Hence, the propagation time in the destination's reference frame is $$t_{prop} = t - t_0 = \frac{d_0}{c - v}.$$

This expression can also be used to calculate the propagation time of an impulse to a stationary receiver by setting v=0, or to a receiver moving directly toward from the point at which the impulse was emitted under the convention that motion toward the emitter corresponds to negative velocity.

With this example in mind, the first term $\tau\Delta_{01}$ in Equation 18 represents the propagation time difference in the reverse and forward links, respectively, between D and $S_1$. Since $t_{31} > t_0 + T_0$, this term is maximized when $S_1$ moves away from D at maximum velocity and is minimized when $S_1$ moves toward D at maximum velocity. In the fowler case, we can write $$\tau_{\Delta_{01}}^+ = \max[\tau_{10}(t_{31}) - \tau_{01}(t_0 + T_0)]$$
$$= \frac{d_{01} + v(t_{31} - t_0)}{c} - \frac{d_{01} + vT_0}{c - v}$$
$$= \frac{\beta(t_{31} - t_0 - T_0 - d_{01}/c) - \beta^2 t_{31}}{1 - \beta}$$

where $\beta := v/c$, $d_{01}$ is the distance from $S_1$ to D at time $t=t_0$. Similarly, when $S_1$ moves toward D at maximum velocity, we can write $$\tau_{\Delta_{01}}^- = \min[\tau_{10}(t_{31}) - \tau_{01}(t_0 + T_0)]$$
$$= \frac{d_{01} + v(t_{31} - t_0)}{c} - \frac{d_{01} + vT_0}{c + v}$$
$$= \frac{-\beta(t_{31} - t_0 - T_0 - d_{01}/c) - \beta^2 t_{31}}{1 + \beta}.$$

It can be shown that $|\tau\Delta_{01}^-| \geq |\tau\Delta_{01}^+|$. Hence, it is evident that $$|\tau_{\Delta_{01}}| \leq \frac{\beta\left(\frac{t_{31} - t_0 -}{T_0 - d_{01}/c}\right) - \beta^2 t_{31}}{1 + \beta} \leq \frac{\beta\left(\frac{t_{31} -}{t_0 - T_0}\right) + \beta^2 t_{31}}{1 - \beta} \quad \text{(Equation 19)}$$

where the second inequality is applied to allow for a more convenient representation of the overall bound on $|\tau\Delta|$.

The second term $\tau\Delta_{21}$ in Equation 18 represents the propagation time difference in the links between $S_1$ and $S_2$. Since $t_2 + T_2 > t_1$, this term is maximized when the sources are separating at maximum velocity and is minimized when the sources are approaching each other at maximum velocity. In the former case, $$\tau_{\Delta_{21}}^+ = \max[\tau_{21}(t_2 + T_2) - \tau_{12}(t_1)]$$
$$= \frac{d_{12} + 2v(t_2 + T_2 - t_0)}{c - v} - \frac{d_{12} + 2v(t_1 - t_0)}{c - v}$$
$$= \frac{2\beta(t_2 + T_2 - t_1)}{1 - \beta}$$

where $d_{12}$ is the distance from $S_1$ to $S_2$ at time $t=t_0$. Similarly, when the sources are approaching each other at maximum velocity, $$\tau_{\Delta_{21}}^- = \min[\tau_{21}(t_2 + T_2) - \tau_{12}(t_1)]$$
$$= \frac{d_{12} - 2v(t_2 + T_2 - t_0)}{c + v} - \frac{d_{12} - 2v(t_1 - t_0)}{c + v}$$
$$= \frac{-2\beta(t_2 + T_2 - t_1)}{1 + \beta}.$$

It can be shown that $|\tau\Delta_{21}^+| \geq |\tau\Delta_{21}^-|$. Hence, it is evident that $$|\tau_{\Delta_{21}}| \leq \frac{2\beta(t_2 + T_2 - t_1)}{1 * \beta}. \quad \text{(Equation 20)}$$

The third term $\tau\Delta_{02}$ in Equation 18 represents the propagation time difference in the forward and reverse links, respectively, between D and $S_2$. Since $t_{32} > t_0 + T_0$, this term is maximized when $S_2$ moves toward D at maximum velocity and is minimized when $S_1$ moves away from D at maximum velocity. In the former case, $$\tau_{\Delta_{02}}^+ = \max[\tau_{02}(t_0 + T_0) - \tau_{20}(t_{32})]$$
$$= \frac{d_{02} - vT_0}{c + v} - \frac{d_{02} + v(t_{32} - t_0)}{c}$$
$$= \frac{\beta(t_{32} - t_0 - T_0 - d_{02}/c) - \beta^2 t_{32}}{1 + \beta}$$

where $d_{02}$ is the distance from $S_2$ to D at time $t=t_0$. Similarly, when $S_2$ moves away from D at maximum velocity, $$\tau_{\Delta_{02}}^- = \min[\tau_{02}(t_0 + T_0) - \tau_{20}(t_{32})]$$
$$= \frac{d_{02} + vT_0}{c - v} - \frac{d_{02} + v(t_{32} - t_0)}{c}$$
$$= \frac{-\beta(t_{32} - t_0 - T_0 - d_{02}/c) + \beta^2 t_{32}}{1 - \beta}.$$

It can be shown that $|\tau\Delta_{02}{}^+| \geq |\tau\Delta_{02}{}^-|$. Hence, it is evident that $$|\tau_{\Delta_{02}}| \leq \frac{\beta\left(\dfrac{t_{32}-t_0-}{T_0-d_{02}/c}\right)+\beta^2 t_{32}}{1+\beta} \leq \frac{\beta\left(\dfrac{t_{32}-}{t_0-T_0}\right)+\beta^2 t_{32}}{1-\beta} \quad \text{(Equation 21)}$$

where the second inequality is applied to allow for a more convenient representation of the overall bound on $|\tau\Delta|$.

Letting $t_p$ denote an upper bound on the propagation delay of all links in the system (over all timeslots), $$t_{31} \leq t_0 + 3t_p + T_0 + T_1 + T_2,$$

$$t_{32} \leq t_0 + 4t_p + T_0 + T_1 + T_2, \text{ and}$$

$$t_2 + T_2 - t_1 \leq t_p + T_1 + T_2. \quad \text{(Equations 22-24)}$$

Substituting Equations 22-24 in Equations 19-21 and summing the results, $$|\tau_\Delta| \leq \frac{\beta(9t_p + 4(T_1 + T_2)) + \beta^2(7t_p + 2(T_0 + T_1 + T_2))}{1-\beta}.$$

In the typical case when $\beta \ll 1$ and $T_1 = T_2$, the bound can be approximated as $$|\tau\Delta| \leq \beta[9t_p + 8T_1]. \quad \text{(Equation 25)}$$

This is the result used to bound the initial carrier phase offset at the start of beamforming (Equation 17).

Figure 10:
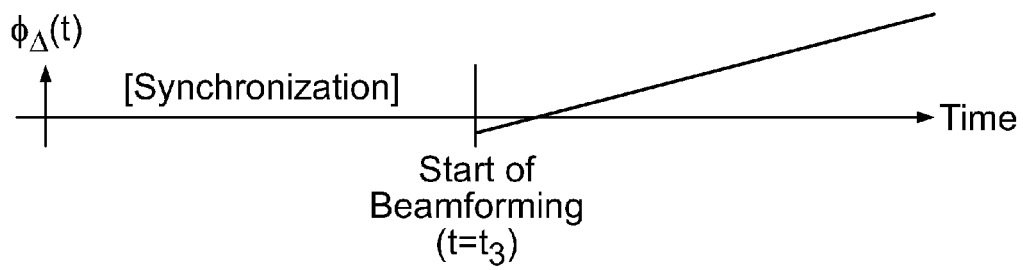
FIG. 10 is a diagram showing synchronization and beamforming steps of the present invention, taken over time.

FIG. 10 is a diagram showing the time sequence of synchronization and beamforming events versus beamforming quality. As can be seen, following the synchronization period, beamforming starts with a slight level of phase offset, followed by a period of phase drift (represented by the diagonal line in FIG. 10). As discussed above, the present invention corrects for such phase drift.

Figure 11:
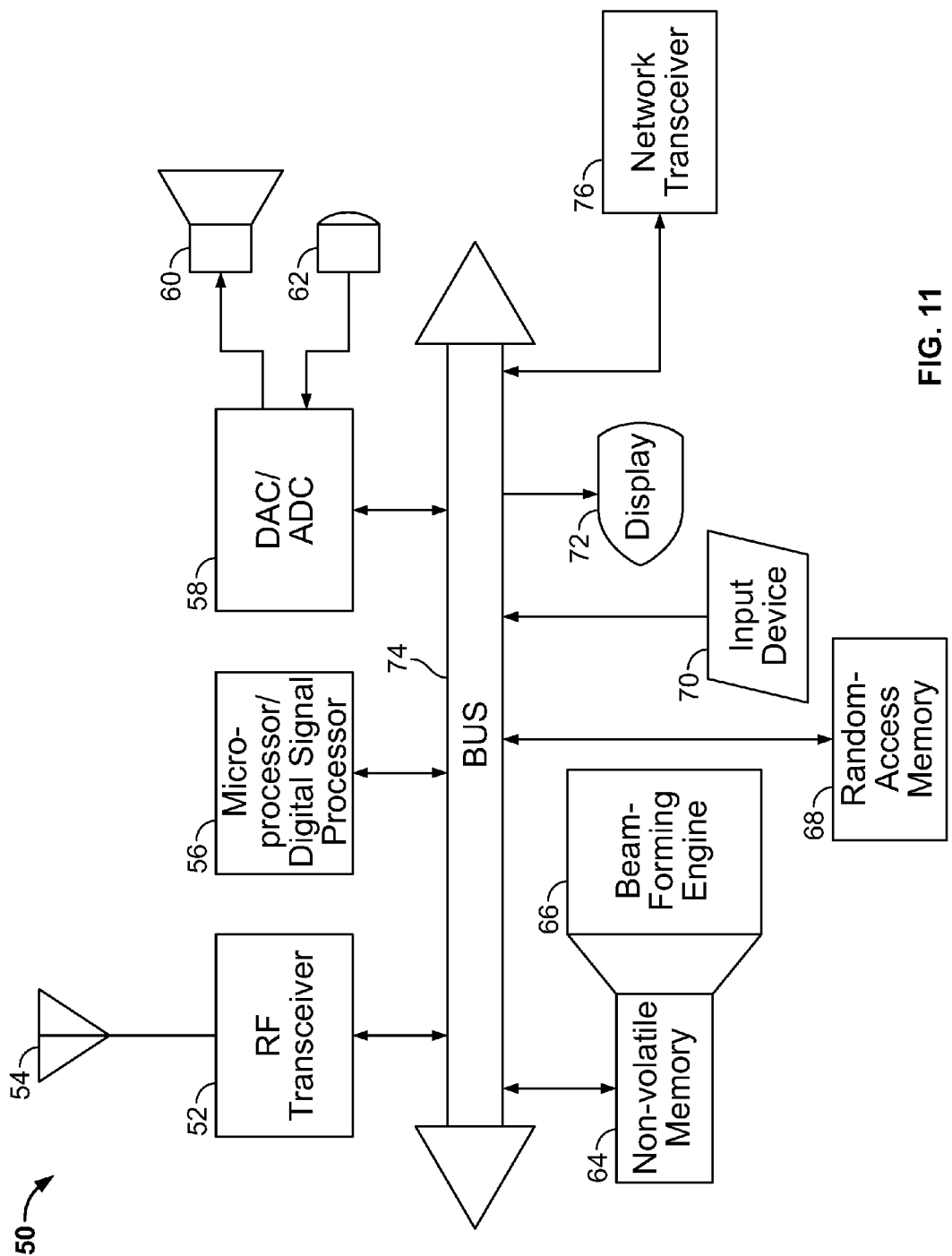
FIG. 11 is a diagram showing hardware components of a wireless communications device in which the present invention can be implemented.

FIG. 11 is a schematic diagram showing hardware components of a wireless communications device 50 in which the present invention could be implemented. The device 50 could be a cellular telephone, a cellular base station, a personal computer with a wireless local area network adapter, etc., and could include a radio frequency (RF) or acoustic transceiver 52, a single antenna 54 for allowing RF communication between the transceiver 52 and another device, a microprocessor/digital signal processor 56, a digital-to-analog/analog-to-digital converter (DAC/ADC) 58, a speaker 60, a microphone 62, a non-volatile memory 64 (e.g., read-only memory (ROM), electrically-erasable, programmable ROM (EEPROM), flash memory, or any other suitable, non-volatile computer-readable medium), a random-access memory 68, a an input device 70, and a display 72. A bus 74 permits communication between the foregoing subsystems. In the case of a wireless local area network adapter, the DAC/ADC 58, speaker 60, microphone 62, input device 70, and display 72 need not be provided, and the bus 74 could communicate with a suitable network transceiver 76, such as an Ethernet transceiver. It is noted that the communications device 50 could be implemented at each of the nodes 12a,-12b, 16, 112a-112M, and 116 of FIGS. 1 and 8.

The present invention could be embodied as a software/firmware module in the form of a beamforming engine 66 which is stored in the memory 64 and executed by the microprocessor 56. The engine 66 could be coded in any suitable high- or low-level programming language, and performs the functions discussed herein to optimize beamforming by synchronizing phases and frequencies. The engine 66 controls phase and frequency parameters of the RF transceiver 52, as discussed above, so that the phase and frequency of the transceiver 52 is synchronized with one or more other transceivers to achieve a desired beamforming pattern to a destination.

Figure 12:
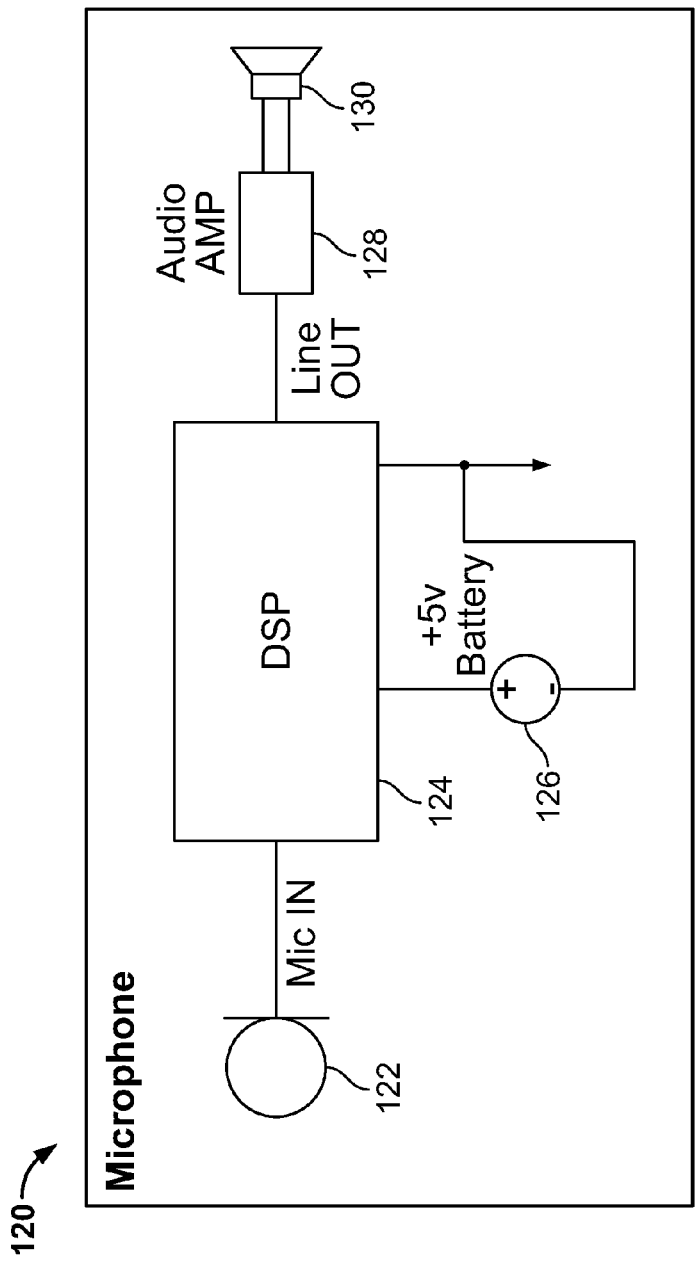
FIG. 12 is a schematic diagram showing an acoustic implementation of the present invention.

FIG. 12 is a schematic diagram showing an acoustic node according to the present invention, indicated generally at 120. As mentioned above, the present invention can be implemented using non-RF wireless signals, such as acoustic signals (i.e., signals in the audio range, as well as subsonic and supersonic acoustic signals). The acoustic node 120 could be substituted for each of the RF nodes 12a, 12b of FIGS. 1 and 112a-112M of FIG. 8, discussed above. The acoustic node 120 includes a microphone 122, a digital signal processor (DSP) 124 programmed using DSK code composer studio software, an audio amplifier 128, a speaker 130, and a +5 VDC power supply 126. The DSP 124 could include the TMS320C6713DSK chip manufactured by Texas Instruments, Inc., or any other suitable equivalent. The speaker 130 and the microphone 122 transmit and receive acoustic signals, and could both be substituted with a single acoustic transceiver module.

Figure 13:
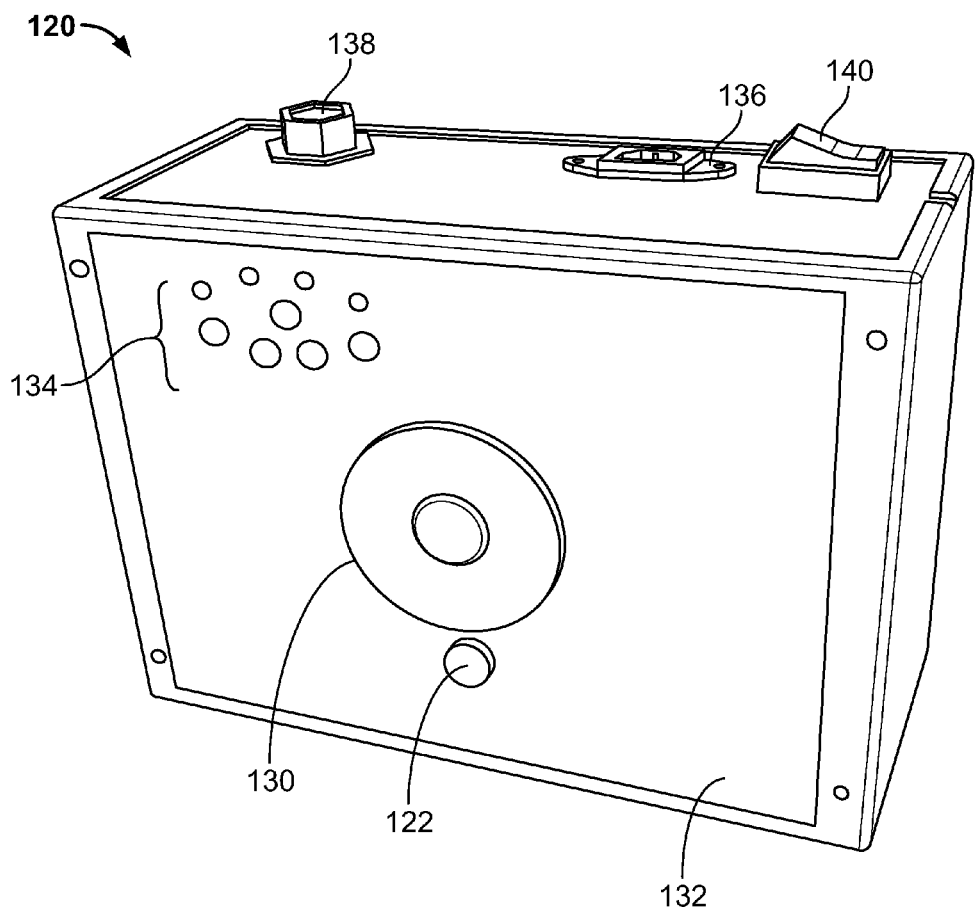
FIG. 13 is a perspective view of the system shown in FIG. 12.

FIG. 13 is a perspective view of the acoustic node 120. The node 120 includes a housing 132, to which the microphone 122 and speaker 130 are mounted. Optionally, diagnostic buttons and/or lights 134 could be provided. An AC power connection 136 could also be provided (with corresponding power supply equipment within the housing 132, as well as connector 138 for connecting the node 120 to an external computer system (e.g., for diagnostic and/or data retrieval purposes), and a switch 140 for turning the node 120 on and off.

Figure 14:
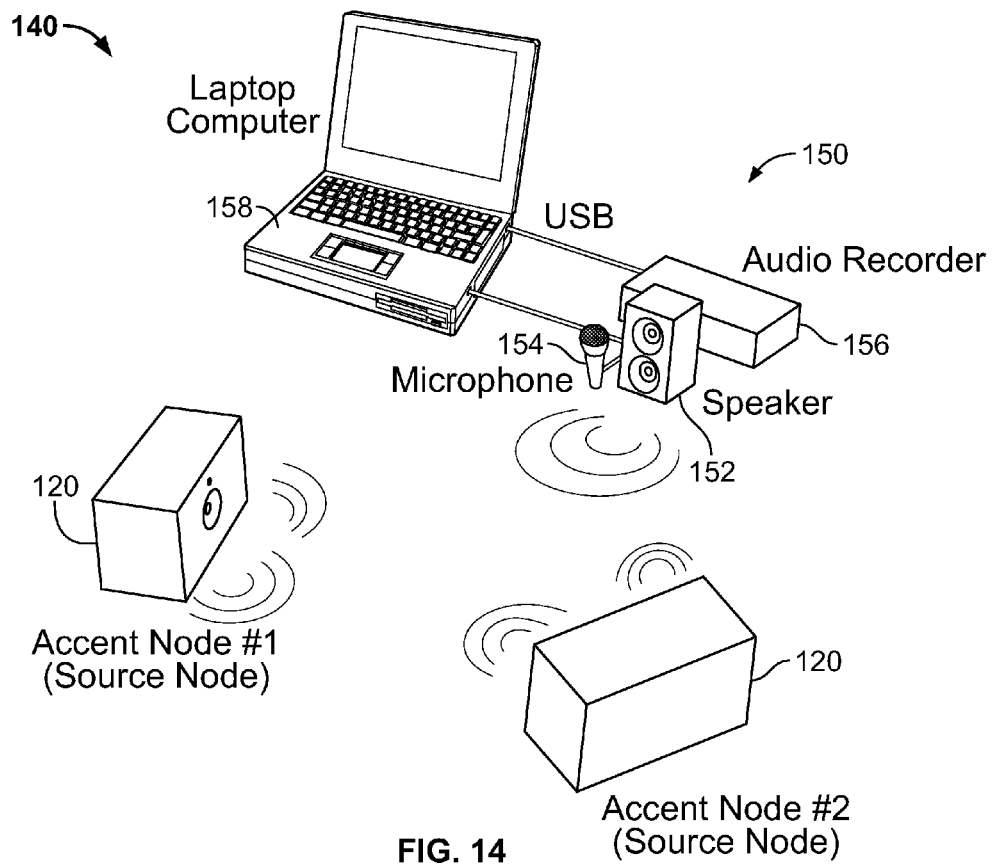
FIG. 14 is a perspective view showing an acoustic beamforming setup according to the present invention.

FIG. 14 is a diagram showing two of the acoustic nodes 120 in a beamforming arrangement 140 with a destination node 150. The destination node 150 includes a speaker 152, a microphone 154, an audio recorder module 156, and a computer system 158 (e.g., a laptop computer). The nodes 120 are programmed to execute the phase and frequency synchronization processes of the present invention (in the form of beamforming engines), so as to optimize acoustic beamforming with the destination node 150. Of course, more than two nodes 120 could be provided. A primary beacon signal can be generated by the destination node 150 using the commercially-available Goldware computer program, and the primary beacon signal is received by the nodes 120 and processed as discussed hereinabove. The output from the destination node 150 can also be recorded using the audio recorder 156 at a high sampling rate, e.g., 44,100 samples per second, for analysis of the beamforming pattern received from the nodes 120. Each node 120 includes a 6-th order IIR filter to isolate a 907 Hz tone (which is used as the carrier frequency), as well as an independent local oscillator, which can be generated by multiplying the frequency of the crystal oscillator up to a fixed, nominal frequency. Of course, other carrier frequencies are possible. The 907 Hz carrier frequency was calculated using the following equation, which converts cell-phone carrier frequencies (e.g., of 800 MHz) to acoustic frequencies:

$$\lambda = \frac{\upsilon}{f_{RF}} = \frac{\upsilon}{f_{acoustic}} \rightarrow \frac{3e8}{800e6} = \frac{340}{f_{acoustic}} \rightarrow f_{acoustic} \approx 907 \text{ Hz}$$

Figure 15:
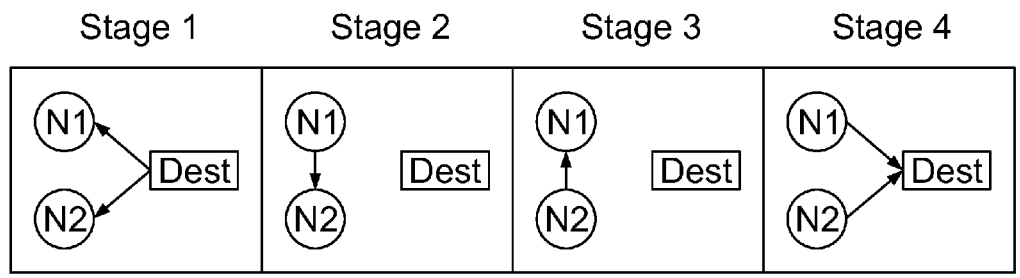
FIG. 15 is a diagram showing acoustic beacon signaling implemented by the present invention.

FIG. 15 is a diagram showing operation stages of the acoustic implementation of the present invention discussed above in connection with FIGS. 12-14. As can be seen, the phase and frequency synchronization process occurs in four stages labeled Stages 1-4. In Stage 1, a 907 Hz tone is transmitted from the destination node (corresponding to the destination node 150, discussed above) to the source nodes (N1-N2, corresponding to the acoustic nodes 120, discussed above), and local phase and frequency estimates are made by the nodes N1 and N2. Then, during Stage 2, the first node N1 transmits the 907 Hz tone to the second node N2 using the phase at which the tone was received at node N1, and the node N2 makes additional local phase and frequency estimates. During Stage 3, the 907 Hz tone is transmitted from the second node N2 to the first node N1, and the node N1 makes additional local phase and frequency estimates. Finally, in Stage 4, both nodes N1 and N2 transmit simultaneously to the destination node using the phase and frequency estimates, so that the acoustic signals arrive at the destination in phase and combine constructively to optimize beamforming to the destination.

Figure 16:
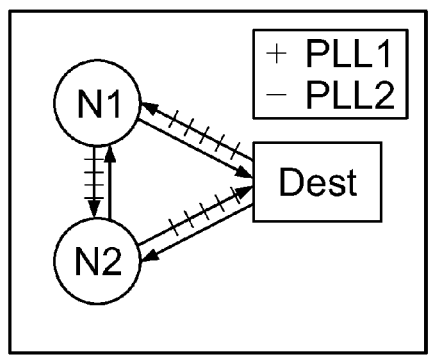
FIG. 16 is a diagram showing phase lock loops established by the acoustic implementation of the present invention.

FIG. 16 is a diagram showing a phase-locked-loop (PLL) arrangement which can be implemented with the source nodes N1 and N2 and the destination node. As shown in FIG. 16, two PLL signal loops PLL 1 and PLL 2 can be established between the nodes to ensure that the original phase transmitted from the destination node is kept accurately at the source nodes, and that the signals transmitted to the destination will have identical phases.

Figure 17A:
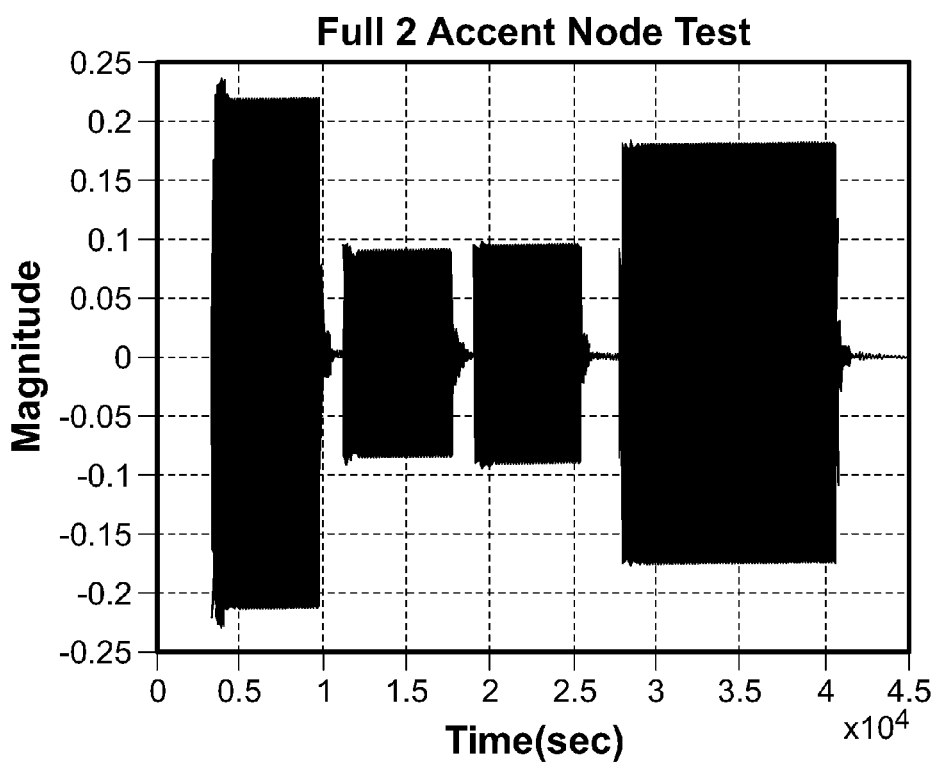
FIGS. 17A-17E are diagrams showing performance tests of the acoustic implementation of the present invention.
Figure 17B:
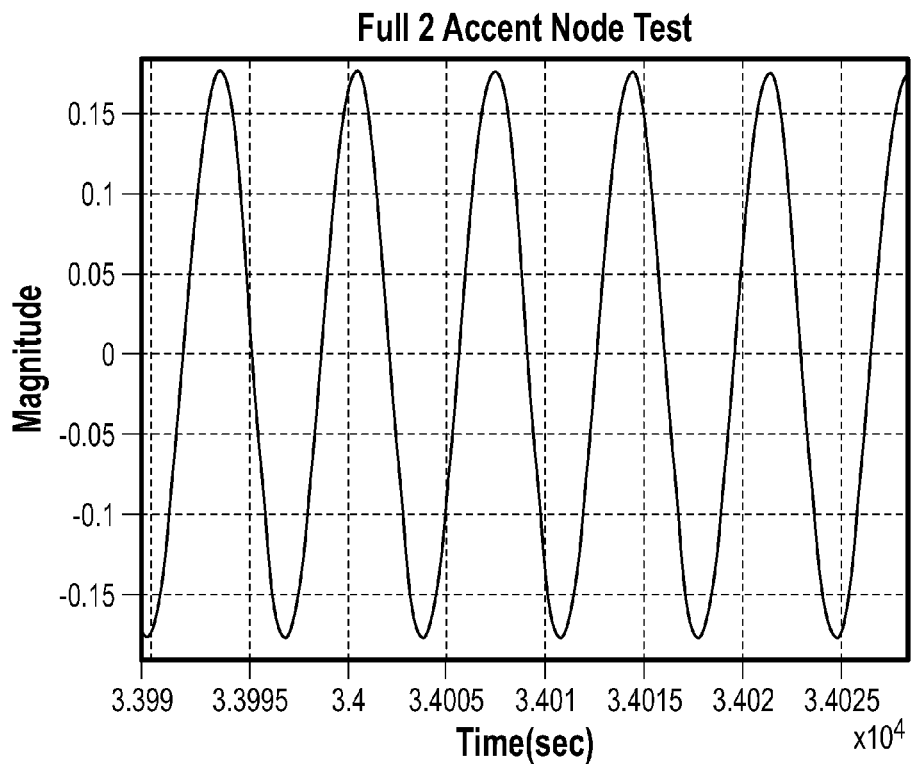
Figure 17C:
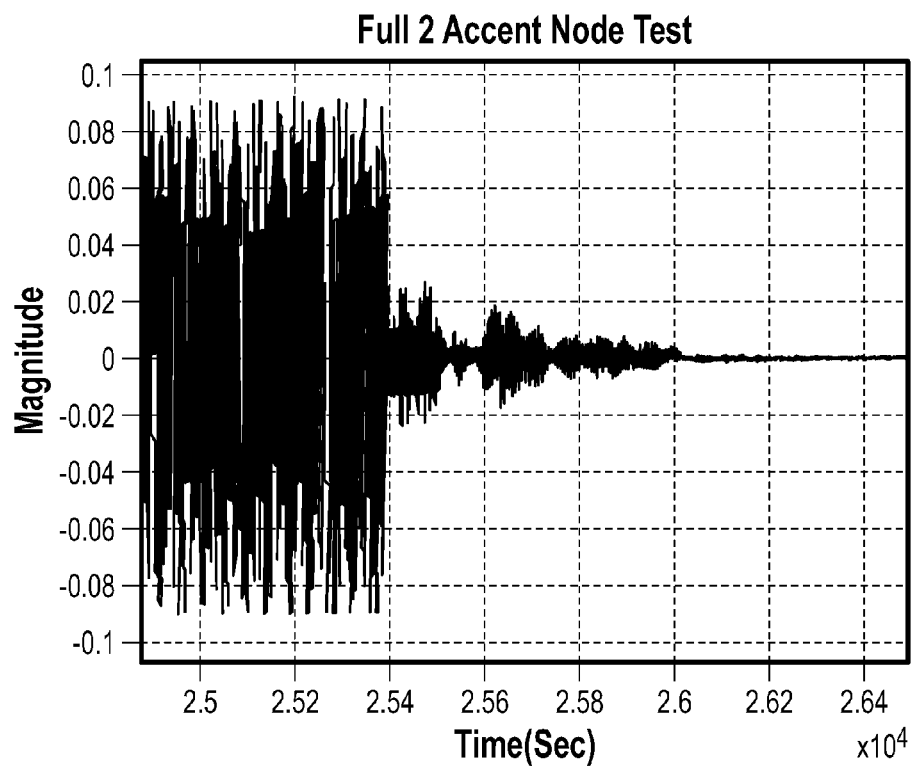
Figure 17D:
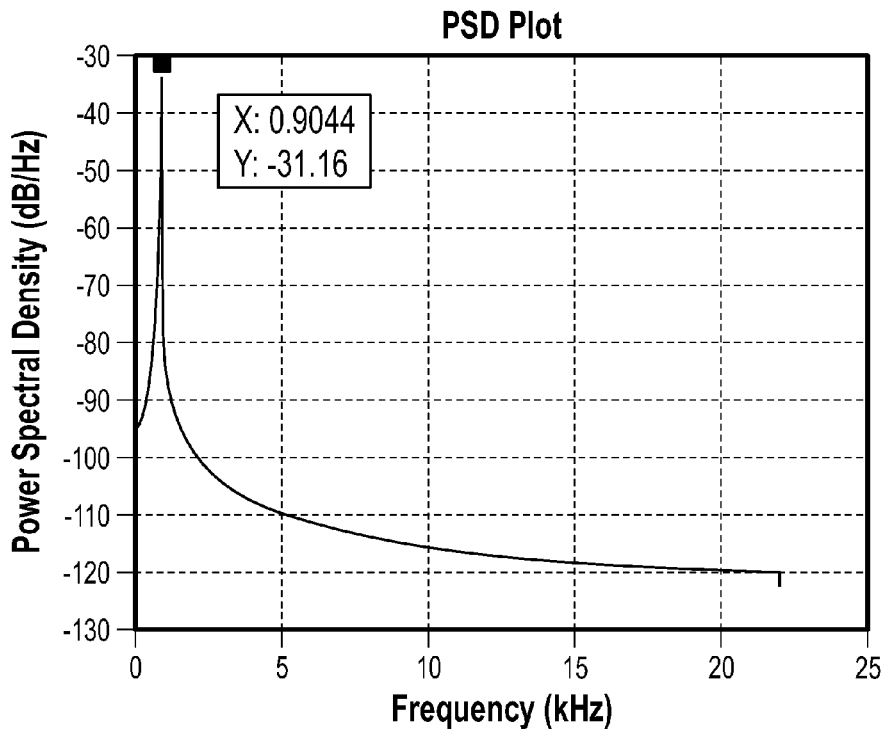
Figure 17E:
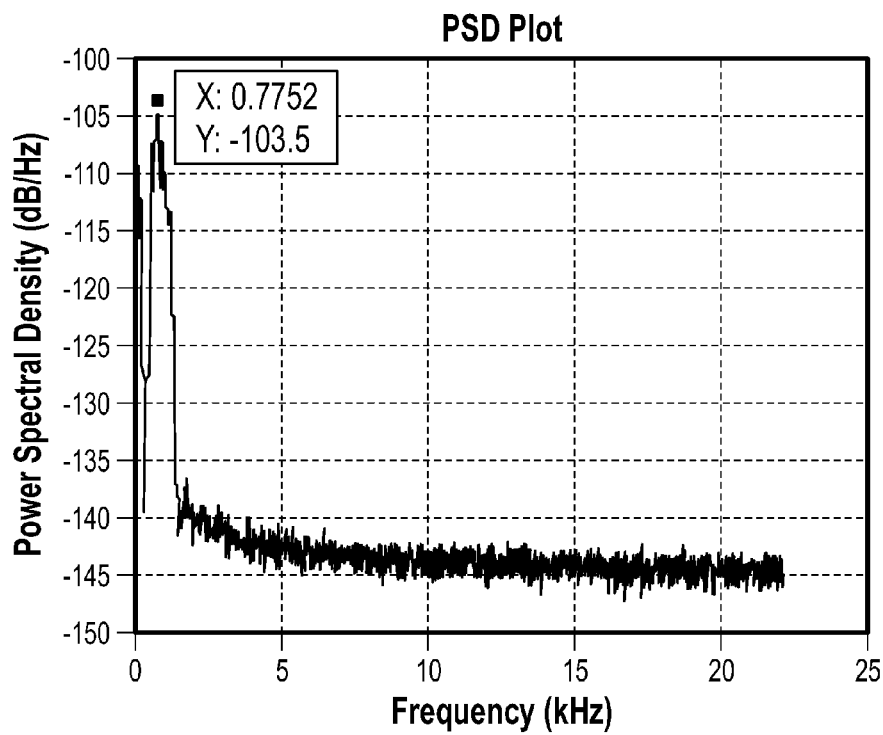

FIGS. 17A-17E are charts showing performance tests of the acoustic implementation of the present invention. FIG. 17A is an oscilloscope trace showing signaling during Stages 1-4. As can be seen, there are four tones which represent the signals of Stages 1-4, discussed above. The first portion of the trace shows the primary beacon signal during Stage 1. The second and third portions of the trace show the secondary beacon signals exchanged during Stages 2-3. The last portion of the trace shows the beamformed signal transmitted to the destination node in Stage 4. As can be seen, the magnitude of the trace in Stage 4 is almost double the magnitude of the trace in Stages 2-3, indicating that the signals arrived at the destination in nearly perfect phase alignment. FIG. 17B shows the signal of FIG. 17A in more detail, and FIG. 17C shows the behavior of the signal when the speaker of the destination node was turned off. A frequency domain graph of tone over the noise floor is shown in FIG. 17D, and FIG. 17E shows a recording of a quiet room, which was obtained for comparison purposes.

Figure 18:
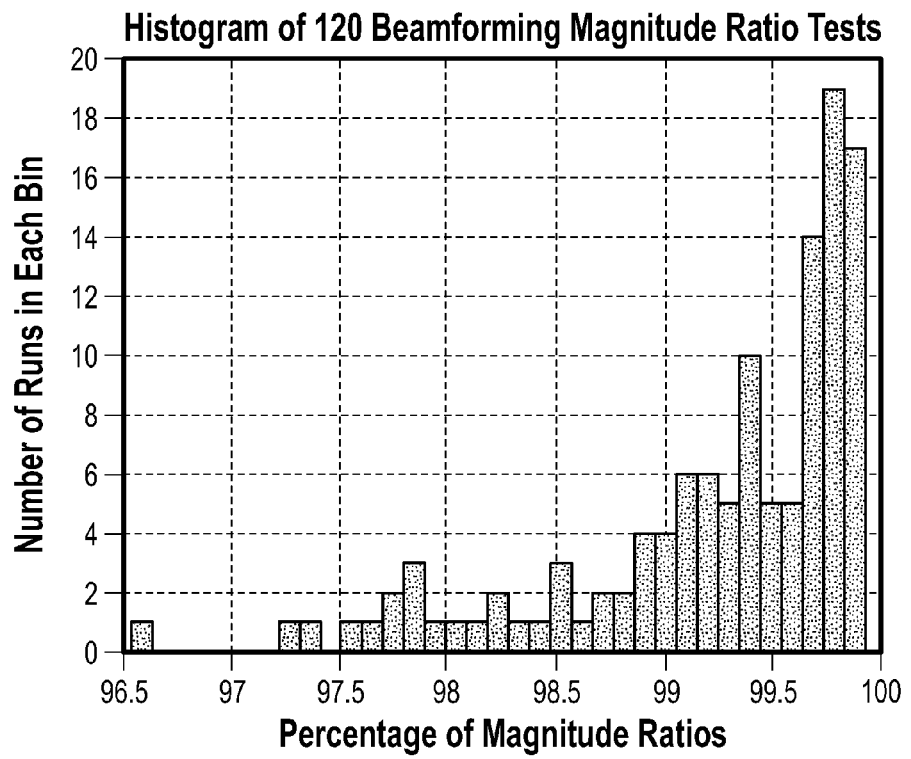
FIGS. 18-19 are histograms showing beamforming magnitude and energy ratio tests of the acoustic implementation of the present invention.
Figure 19:
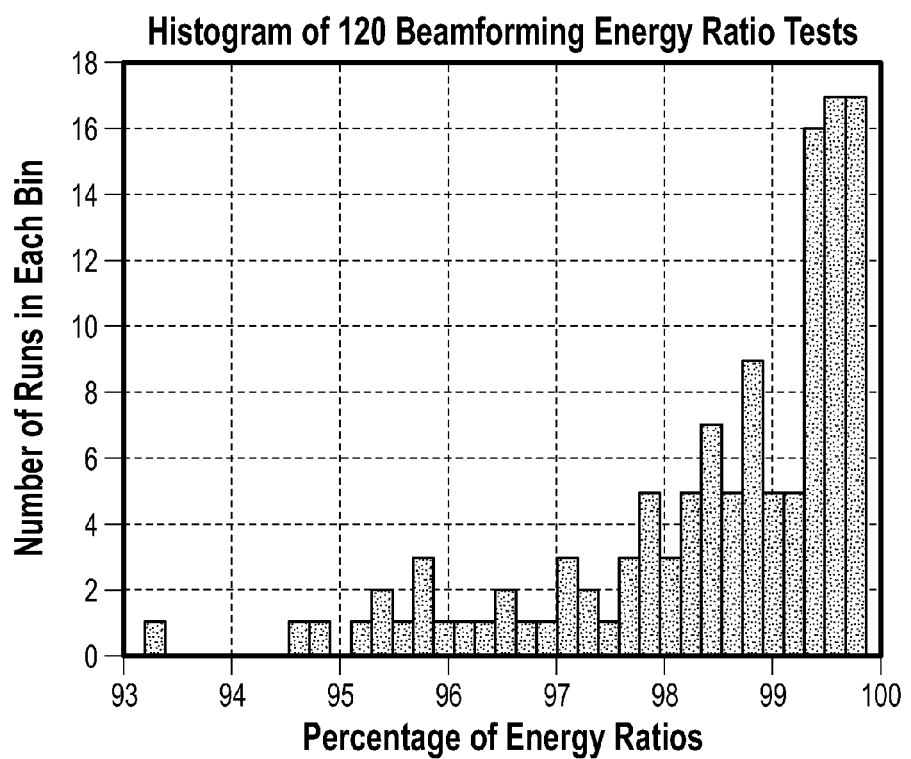

FIGS. 18-19 are histograms showing beamforming magnitude ratio and beamforming energy ratio tests of the acoustic implementation of the present invention, taken after 120 consecutive test runs. The results were analyzed using the following MATLAB code, which took the absolute value of the signal, processed it through a low-order Butterworth filter, and processed a mean value throughout the whole signal while omitting a transient of the filter:

TABLE 1

```
6   clear all;
7   clc;
8   fs=44100;
9   interval_length = 0.3;
10  high_threshold = 0.2;
11  low_threshold = 0.2;
12
13  x = wavread('Z:\500_Research\Test on Server\filtered_pingpong2.wav');
14  x = x(:,1);
15
16  first_begin = 0;
17  next_begin = 0;
18  k=0;
19  j = 1;
20  i = 1;
21
22  while(j < (length(x)−22*fs))
23  %%%%%%%%%%%%%%%%%%% INPUT BEACON DETECTOR%%%%%%%%%%%%%%%%%%%%%
24      first_begin = 0;
25      k = 0;
26      while (first_begin==0)
27          if ((x(j) < low_threshold)) % find the end of the previous beacon
28              k = k+1;
29          else
30              k = 0;
31          end
32          if (k>= 1000)
33              while (first_begin == 0)
34                  j = j+1;
35                  if (x(j) > high_threshold)
36                      first_begin = j;
37                  end
38              end
39          end
40          j = j+1;
41      end
42  %%%%%%%%%%%%%%%%%%%%%%%%%%%%%%%%%%%%%%%%%%%%%%%%%%%%%%%%%%%%
43  %%%%%%%%%%%%%%%%%%% NODE 1 BEACON DETECTOR%%%%%%%%%%%%%%%%%%%%%
44      next_begin = 0; % reset the beginning-of-next-beacon flag
45      k = 0; % reset variable that counts the 'quiet' % Input beacon detector
46      while(next_begin==0)
47          if ((x(j) < low_threshold)) % find the end of the previous beacon
48              k = k+1;
49          else
50              k = 0;
51          end
```

TABLE 1-continued

```
52          if (k >= 1000) % beacon ended, now find the beginning of next beacon Node1
               beacon
53             while (next_begin==0)
54                j = j+1;
55                if (x(j) > high_threshold)
56                   next_begin = j;
57                end
58             end
59             time = next_begin/44100;
60             a = x((j+0.2*fs) : (j+0.2*fs+interval_length*fs)); % NODE 1 BEACON
61          end
62          j = j+1;
63       end
64  %%%%%%%%%%%%%%%%%%%%%%%%%%%%%%%%%%%%%%%%%%%%%%%%%%%%%%%%%%%
98          if (k >= 1000) % beacon ended, now find the beginning of next beacon Node1
               beacon
99             while (next_begin==0)
100               j = j+1;
101               if (x(j) > high_threshold)
102                  next_begin = j;
103               end
104            end
105            time = next_begin/44100;
106            c = x((j+0.5*fs) : (j+0.5*fs+interval_length*fs)); % NODE 1+2 BEACON
107         end
108         j = j+1;
109      end
110 %%%%%%%%%%%%%%%%%%%%%%%%%%%%%%%%%%%%%%%%%%%%%%%%%%%%%%%%%%%
111
112      j = j+0.5*fs+interval_length*fs;
113
114      a_estimate = envelopePLL(a);
115      b_estimate = envelopePLL(b);
116      c_estimate = envelopePLL(c);
117
118      percentage(i) = c_estimate*100/(a_estimate+b_estimate);
119      energy(i) = 100*((percentage(i)/100).^2);
120      energy(i)
121      i=i+1;
122
123
124   end
125   figure(1)
126   hist(percentage,20);
127   figure(2)
128   hist(energy,20);
```

The following MATLAB code was also used to generate PLL envelopes:

TABLE 2

```
6    function [estimate] = envelopePLL(signal)
7
8    % design a low-pass filter.
9    [B,A]=butter(2,0.001);
10   % get length of the signal
11   s_length = length(signal) ;
12   % get power of the signal
13   signal_h = signal.^2;
14   % filter twice, multiply times two, take sqrt
15   envelope_est = sqrt(2*filtfilt(B,A,signal_h));
16   % figure out the mean over the whole length of the signal
17   estimate = mean(envelope_est(4410:s_length));
18
19   end
```

The following formulas were used to find the accuracy ratio of the acoustic implementation of the present invention, where the values A, B, and C represent the magnitudes of the beacons:

$$\text{Percentage} = 100 * \frac{C}{A+B}$$

$$\text{Energy} = 100 * \left(\frac{C}{A+B}\right)^2$$

Having thus described the invention in detail, it is to be understood that the foregoing description is not intended to limit the spirit or scope thereof.

What is claimed is:

1. A method for synchronizing phases and frequencies of devices in multi-user, wireless communications systems, comprising the steps of:

transmitting a first beacon signal from a transmitter at a destination node in the wireless communications system to a plurality of source nodes in the wireless communications system;

processing the first beacon signal at the plurality of source nodes to estimate local phases and frequencies at the plurality of source nodes;

transmitting a second beacon signal from a first node of the plurality of source nodes to a second node of the plurality of source nodes;

processing the second beacon signal at the second node of the plurality of source nodes to estimate local phases and frequencies at the second node;

transmitting a third beacon signal from the second node to the first node;
processing the third beacon signal at the first node to estimate local phases and frequencies at the first node; and
simultaneously transmitting common information from the plurality of source nodes to the destination node at carrier frequencies based on the local phases and frequencies estimated by the plurality of source nodes, wherein phases and frequencies of transmitted common information are synchronized to facilitate coherent combining of common information at the destination node.

2. The method of claim 1, wherein the steps of transmitting the beacon signals comprises transmitting sinusoidal beacon signals.

3. The method of claim 1, further comprising the step of compensating for Doppler effects at the plurality of source nodes prior to transmitting the common information to the destination node.

4. The method of claim 1, further comprising the step of compensating for motion of one or more of the plurality of source nodes or the destination node prior to transmitting the common information to the destination node.

5. The method of claim 1, wherein the steps of transmitting the beacon signals comprises transmitting radio-frequency beacon signals.

6. The method of claim 5, wherein the step of transmitting the common information comprises transmitting the common information using radio-frequency signals.

7. The method of claim 1, wherein the steps of transmitting the beacon signals comprises transmitting acoustic beacon signals.

8. The method of claim 7, wherein the step of transmitting the common information comprises transmitting the common information using acoustic signals.

9. A system for synchronizing phases and frequencies of devices in multi-user, wireless communications systems, comprising:
a plurality of source nodes, each having a signal transmitter, a signal receiver, and a processor; and
a destination node in wireless communication with the plurality of source nodes;
wherein the destination node transmits a first beacon signal to the plurality of source nodes, the plurality of source nodes process the first beacon signal to estimate local phases and frequencies at the plurality of source nodes; the destination node transmits a second beacon signal from a first node of the plurality of source nodes to a second node of the plurality of source nodes; the second node processes the second beacon to estimate local phases and frequencies at the second node; the second node transmits a third beacon signal to the first node, the first node processes the third beacon signal to estimate local phases and frequencies at the first node, and the plurality of source nodes simultaneously transmit common information to the destination node, the common information arriving in phase and coherently combining at the destination node.

10. The system of claim 9, wherein the beacon signals comprise sinusoidal beacon signals.

11. The system of claim 9, wherein the processors compensate or Doppler effects.

12. The system of claim 9, wherein the processors compensate for motion of one or more of the source nodes or the destination node.

13. The system of claim 9, wherein the beacon signals comprise radio-frequency beacon signals.

14. The system of claim 13, wherein the common information comprises common information transmitted using radio-frequency signals.

15. The system of claim 9, wherein the beacon signals comprise acoustic beacon signals.

16. The system of claim 15, wherein the common information comprises common information transmitted using acoustic signals.

17. A method for synchronizing phases and frequencies of devices in multi-user, wireless communications systems, comprising the steps of:
transmitting a primary beacon signal from a destination node to a plurality of source nodes in communication with the destination node;
locally adjusting phases and frequencies of each of the plurality of source nodes using the primary beacon signal;
transmitting secondary beacon signals through the plurality of source nodes in a first direction;
locally adjusting phases and frequencies of each of the plurality of source nodes using the secondary beacon signals;
transmitting secondary beacon signals through the plurality of source nodes in a second direction; and
locally adjusting phases and frequencies of each of the plurality of source nodes using the secondary beacon signals; and
simultaneously transmitting common information from the plurality of source nodes to the destination node at carrier frequencies based on the local phases and frequencies estimated by the plurality of source nodes, wherein phases and frequencies of transmitted common information are synchronized to facilitate coherent combining of common information at the destination node.

18. The method of claim 17, wherein the steps of transmitting the beacon signals comprises transmitting sinusoidal beacon signals.

19. The method of claim 17, further comprising the step of compensating for Doppler effects at the plurality of source nodes.

20. The method of claim 17, wherein the steps of transmitting the beacon signals comprises transmitting radio-frequency beacon signals.

21. The method of claim 17, wherein the step of transmitting the common information comprises transmitting radio-frequency signals.

22. The method of claim 17, wherein the steps of transmitting the beacon signals comprises transmitting acoustic beacon signals.

23. The method of claim 22, wherein the step of transmitting the common information comprises transmitting the common information using acoustic signals.

* * * * *